(12) United States Patent
Balk

(10) Patent No.: US 8,851,273 B2
(45) Date of Patent: Oct. 7, 2014

(54) CONVEYOR SYSTEM

(71) Applicants: Specialty Conveyor B.V., Zwaag (NL); Ambaflex International B.V., Zwagg (NL)

(72) Inventor: Wouter Balk, Baambrugge (NL)

(73) Assignee: Specialty Conveyor B.V., Zwaag (NL)

( * ) Notice: Subject to any disclaimer, the term of this patent is extended or adjusted under 35 U.S.C. 154(b) by 0 days.

(21) Appl. No.: 13/709,642

(22) Filed: Dec. 10, 2012

(65) Prior Publication Data

US 2013/0256095 A1   Oct. 3, 2013

Related U.S. Application Data

(62) Division of application No. 12/520,794, filed as application No. PCT/NL2007/050695 on Dec. 21, 2007, now Pat. No. 8,328,004.

(30) Foreign Application Priority Data

Dec. 22, 2006   (NL) ..................................... 2000404

(51) Int. Cl.

| | |
|---|---|
| *B65G 21/18* | (2006.01) |
| *B65G 15/10* | (2006.01) |
| *B65G 47/51* | (2006.01) |
| *B65G 47/57* | (2006.01) |
| *B65G 47/71* | (2006.01) |
| *B65G 47/76* | (2006.01) |
| *B65G 47/82* | (2006.01) |
| *B65G 47/52* | (2006.01) |

(52) U.S. Cl.
CPC ............... *B65G 15/10* (2013.01); *B65G 21/18* (2013.01); *B65G 47/5113* (2013.01); *B65G 47/57* (2013.01); *B65G 47/71* (2013.01); *B65G 47/766* (2013.01); *B65G 47/82* (2013.01); *B65G 2207/24* (2013.01); *B65G 47/52* (2013.01)
USPC ........................................ 198/778; 198/370.1

(58) Field of Classification Search
USPC .................. 198/778, 370.01, 370.08–370.09, 198/457.05–457.06
See application file for complete search history.

(56) References Cited

U.S. PATENT DOCUMENTS

| 1,910,241 A | 5/1933 | Chapman |
|---|---|---|
| 3,093,236 A | 6/1963 | McLaughlin |

(Continued)

FOREIGN PATENT DOCUMENTS

| DE | 3444132 | 6/1986 |
|---|---|---|
| DE | 10312695 | 10/2004 |

(Continued)

OTHER PUBLICATIONS

Official Search Report of the European Patent Office Patent Office in foreign application No. PCT/NL2006/000628 filed Dec. 8, 2006.

(Continued)

*Primary Examiner* — Mark A Deuble

(74) *Attorney, Agent, or Firm* — Steven M. Koehler; Westman, Champlin & Koehler, P A

(57) ABSTRACT

A conveyor system for conveying at least one product comprises a spiral first conveyor having a vertically extending central axis. The first conveyor comprises a number of conveying elements extending substantially parallel to each other. Each conveying element comprises at least one supply end for receiving the product and at least one discharge end for discharging the product. The discharge ends of the individual conveying elements are positioned at different vertical levels.

16 Claims, 19 Drawing Sheets

(56) References Cited

U.S. PATENT DOCUMENTS

| | | |
|---|---|---|
| 3,543,916 A | 12/1970 | Berk |
| 3,955,678 A | 5/1976 | Moyer |
| 3,983,989 A | 10/1976 | Wahren |
| 4,413,724 A | 11/1983 | Fellner |
| 4,653,631 A | 3/1987 | Heybourn et al. |
| 4,893,708 A | 1/1990 | Machacek |
| 4,944,162 A | 7/1990 | Lang et al. |
| 5,031,751 A * | 7/1991 | Pahlsson ............ 198/570 |
| 5,105,934 A | 4/1992 | Cawley |
| 5,191,267 A | 3/1993 | Machacek |
| 5,259,302 A | 11/1993 | Chen |
| 5,291,987 A | 3/1994 | Zink |
| 5,335,590 A | 8/1994 | Crump et al. |
| 5,348,436 A | 9/1994 | Hogenkamp et al. |
| 5,413,213 A | 5/1995 | Golz et al. |
| 5,447,223 A | 9/1995 | Dasgupta |
| 5,490,589 A | 2/1996 | Golz |
| 5,655,643 A | 8/1997 | Bonnet |
| 5,664,661 A | 9/1997 | Maier |
| 5,772,005 A | 6/1998 | Hansch |
| 5,833,045 A | 11/1998 | Osti |
| 5,974,682 A | 11/1999 | Akimoto |
| 6,016,904 A | 1/2000 | Hammock et al. |
| 6,065,463 A | 5/2000 | Martin |
| 6,092,641 A | 7/2000 | Draghetti |
| 6,206,947 B1 | 3/2001 | Evans |
| 6,220,422 B1 | 4/2001 | Lee |
| 6,241,074 B1 | 6/2001 | Steeber |
| 6,371,275 B1 | 4/2002 | Terrell et al. |
| 6,394,261 B1 | 5/2002 | DeGennaro |
| 6,523,677 B1 | 2/2003 | DeGennaro et al. |
| 6,607,065 B2 | 8/2003 | Peppel |
| 6,658,993 B2 | 12/2003 | Kuenen |
| 6,666,322 B2 | 12/2003 | Biondi et al. |
| 6,725,674 B1 | 4/2004 | Kamm et al. |
| 6,725,998 B2 | 4/2004 | Steeber et al. |
| 6,868,957 B2 | 3/2005 | Cassoli |
| 7,032,742 B2 | 4/2006 | Hartness et al. |
| 7,107,899 B2 | 9/2006 | Nothum, Jr. |
| 7,163,099 B2 | 1/2007 | Mueller |
| 7,165,670 B2 | 1/2007 | Shefet et al. |
| 7,191,896 B2 | 3/2007 | Hartness et al. |
| 7,240,788 B2 | 7/2007 | Belz et al. |
| 7,252,189 B2 | 8/2007 | Yagi |
| 7,299,589 B2 | 11/2007 | Campbell et al. |
| 7,331,445 B2 | 2/2008 | Roland |
| 7,374,392 B2 | 5/2008 | Biondi et al. |
| 7,469,780 B2 | 12/2008 | Bang |
| 7,775,344 B2 | 8/2010 | Balk |
| 7,823,718 B2 * | 11/2010 | Spencer ............ 198/594 |
| 2003/0173191 A1 * | 9/2003 | Hammock et al. ...... 198/778 |
| 2006/0131139 A1 | 6/2006 | Olsson |
| 2008/0308386 A1 | 12/2008 | Balk |
| 2010/0140054 A1 | 6/2010 | Broers |
| 2011/0259711 A1 | 10/2011 | Broers |
| 2012/0103762 A1 | 5/2012 | Balk |
| 2013/0175139 A1 | 7/2013 | Balk |

FOREIGN PATENT DOCUMENTS

| | | |
|---|---|---|
| DE | 102004007590 | 9/2005 |
| DE | 102006025520 | 12/2007 |
| EP | A 0538742 | 4/1993 |
| EP | 0635414 | 6/1994 |
| EP | 0814038 | 12/1997 |
| EP | A 1389595 | 2/2004 |
| EP | 1534614 | 6/2005 |
| EP | 2039626 | 3/2009 |
| FR | 2769010 | 4/1999 |
| GB | 1084200 | 8/1917 |
| GB | 170321 | 10/1921 |
| GB | 1321396 | 2/1972 |
| GB | 2104030 | 3/1983 |
| GB | 2109765 | 6/1983 |
| GB | A 2129754 | 5/1984 |
| JP | 07033241 | 2/1995 |
| JP | 07157058 | 6/1995 |
| NL | 7101881 | 2/1971 |
| WO | WO 2005102877 | 11/2005 |
| WO | WO 2007/067049 | 6/2007 |
| WO | WO 2007064659 | 6/2007 |
| WO | WO 2007123401 | 11/2007 |
| WO | WO 2008136673 | 11/2008 |
| WO | 2009/005349 | 1/2009 |
| WO | 2010/130716 | 11/2010 |

OTHER PUBLICATIONS

Written opinion of the European Patent Office Patent Office in foreign application No. PCT/NL2006/000628 filed Dec. 8, 2006.

Broers, U.S. Appl. No. 13/123,796, filed Apr. 12, 2011, A Buffer Conveyor Having Parallel Tracks.

European Patent Office in foreign application No. PCT/EP2009/063518 filed Oct. 15, 2008.

International Search Report of the European Patent Office Patent Office in application No. PCT/NL2008/050273 filed May 7, 2008.

Written Opinion of the European Patent Office Patent Office in application No. PCT/NL2008/050273 filed May 7, 2008.

Office Action for U.S. Appl. No. 12/598,692, filed Nov. 3, 2009, mailed Jan. 5, 2012, 9 pages.

European Search Report and Written Opinion of the European Patent Office in foreign application No. PCT/EP2010/056424 filed May 11, 2010.

European Search Report of the European Patent Office in counterpart foreign application No. EP 12171795 and EP 12171803.

Official Search Report of the European Patent Office in counterpart foreign application No. PCT/NL2007/050695 filed Dec. 21, 2007.

Written Opinion of the European Patent Office in counterpart foreign application No. PCT/NL2007/050695 filed Dec. 21, 2007.

AmbaFlex: "Spiral Veyor SVX-DL" Sep. 26, 2008, XP002570630 Retreived from the Internet: URL: http://www.ambaflex.com/assets/www.AmbaFlex.com/downloadables/SpiralVeyor/leaflet_SVX-DL_en.pdf.

Office Action for U.S. Appl. No. 13/709,661, filed Dec. 10, 2012, mailed May 24, 2013.

* cited by examiner

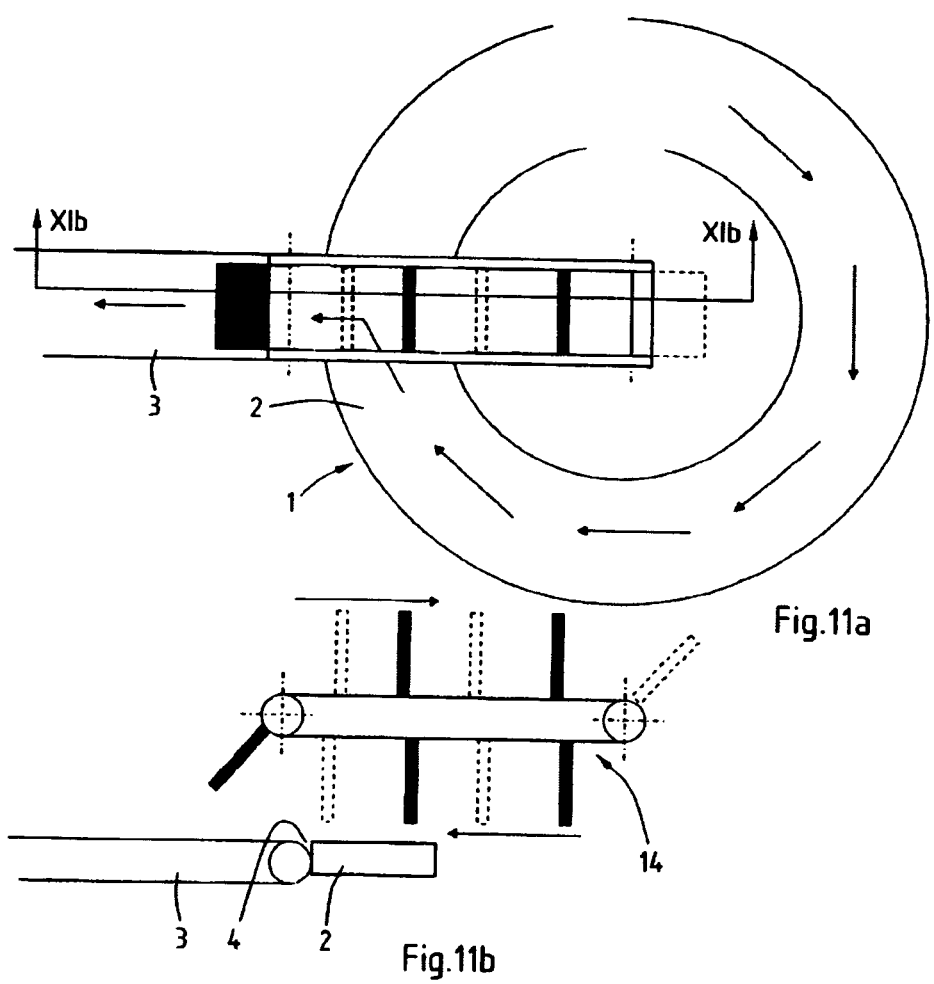

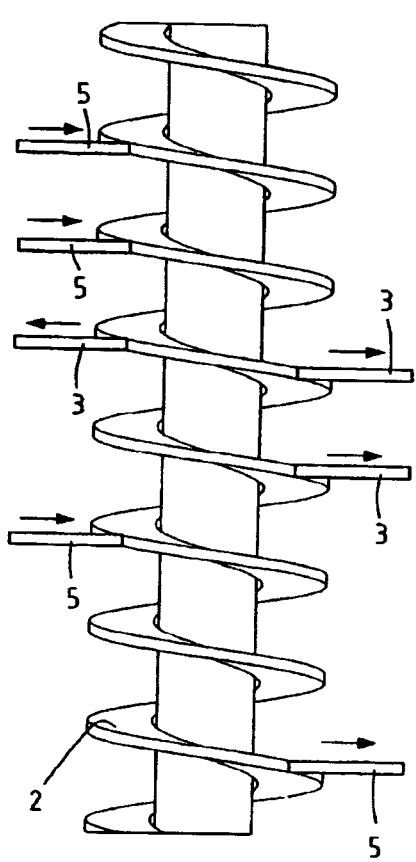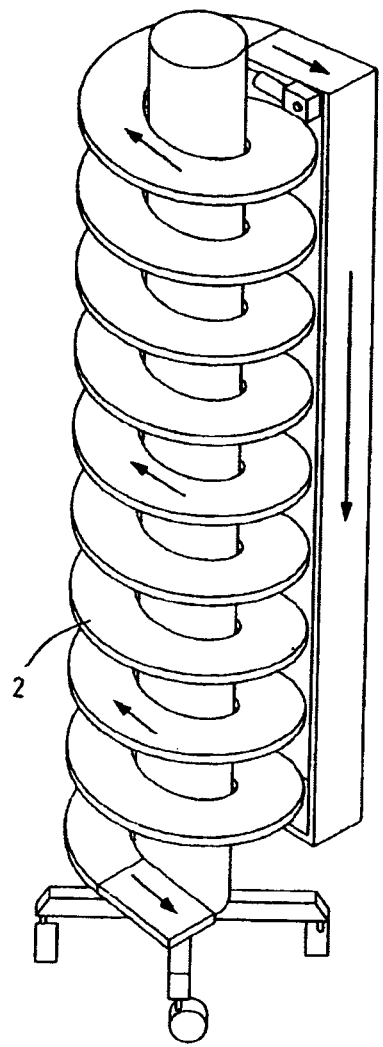
Fig.21
Fig.20

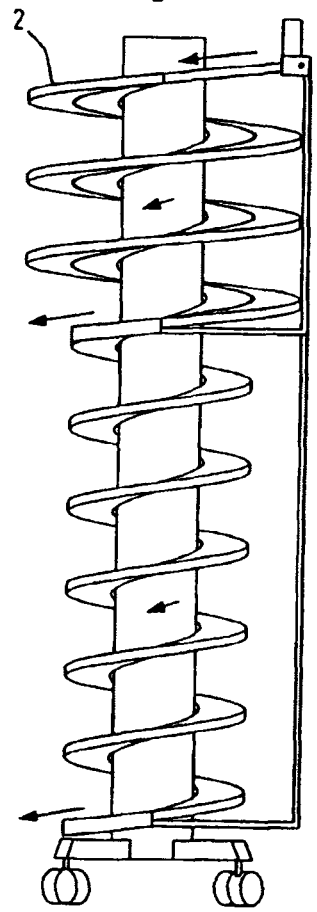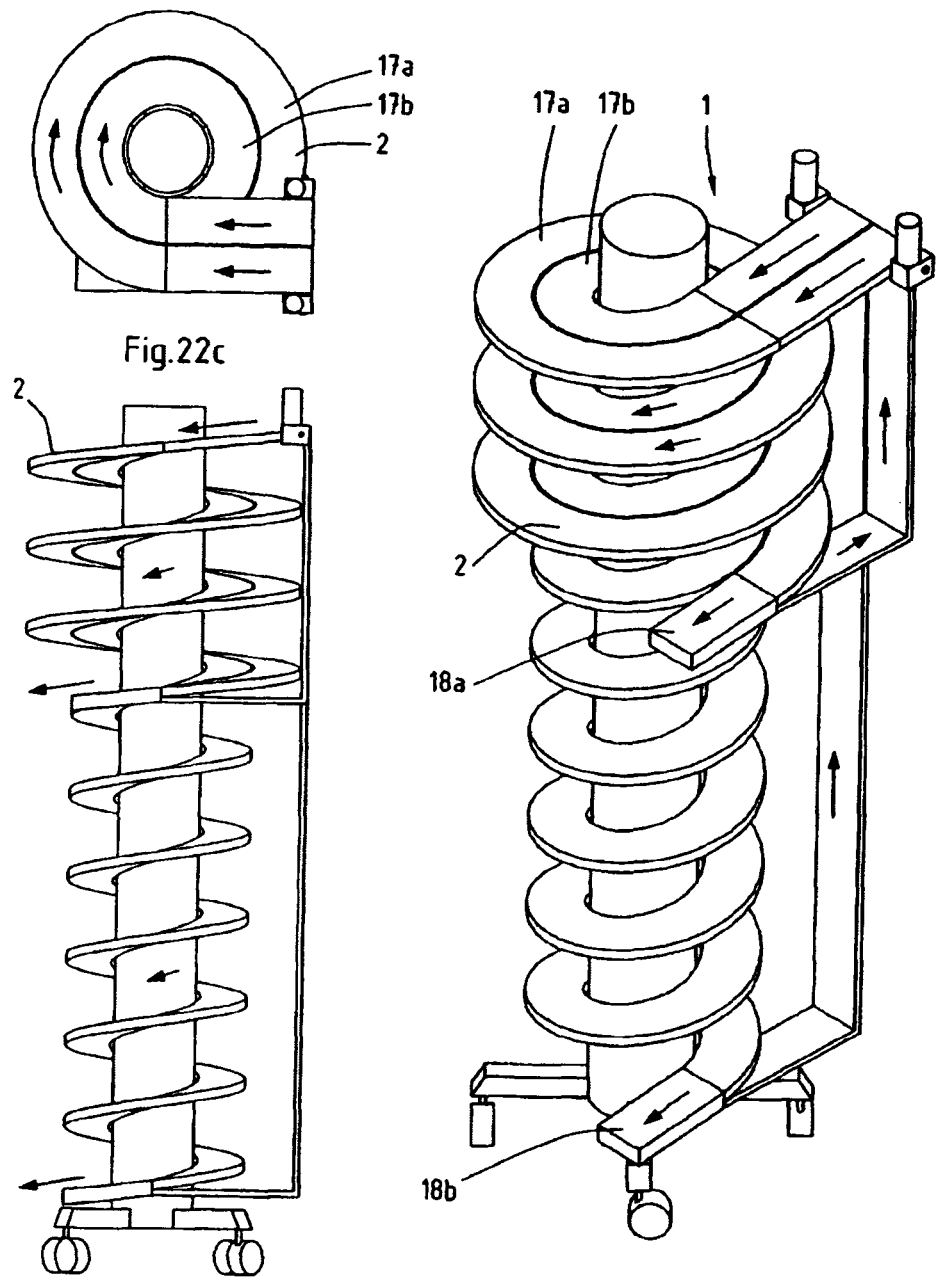
Fig.22c
Fig.22b
Fig.22a

CONVEYOR SYSTEM

BACKGROUND

Aspects of the invention relates to a conveyor system for conveying at least one product.

Conveyor systems in which the products are conveyed from a first conveyor to a second conveyor are known in the art. At present there appears to be a need for a conveyor system in which the first conveyor is provided with at least one outlet between a supply location and a discharge location of the first conveyor so as to be able to transfer products to a next conveyor. This is desirable, for example, when a first conveyor bridges a difference in height and products must leave the first conveyor at different levels for being conveyed further by a next conveyor at each of said levels.

SUMMARY

This Summary and Abstract are provided to introduce some concepts in a simplified form that are further described below in the Detailed Description. This Summary and Abstract are not intended to identify key features or essential features of the claimed subject matter, nor are they intended to be used as an aid in determining the scope of the claimed subject matter. In addition, the description herein provided and the claimed subject matter should not be interpreted as being directed to addressing any of the short-comings discussed in the Background.

A conveyor system for conveying at least one product, comprising at least one first conveyor, which is adjacent to at least one second conveyor via a junction, wherein the conveying direction of the first conveyor near the junction is different from the conveying direction of the second conveyor near the junction. The first conveyor has a first conveying surface and the second conveyor has a second conveying surface for supporting the product thereon. The orientation of the normal of a part of the first conveying surface adjacent to junction is substantially different from that of the normal of a part of the second conveying surface adjacent to the junction. A moving assembly is configured to move the product from the first conveyor to the second conveyor, wherein the first conveyor describes an arcuate path at least near the junction.

Because of the mutually different conveying directions of the first and the second conveyor, respectively, the products will not be automatically moved from the first conveyor to the second conveyor, whilst the first and the second conveying surfaces do not properly connect on account of the mutually different directions of the normals thereof, which may lead to products becoming unstable and possibly falling over at the junction. Because of the presence of the moving assembly, the products are forcedly moved from the first conveyor to the second conveyor, after which they can be conveyed further by the second conveyor. The conveyor system thus provides a possibility of discharging products from the first conveyor to another conveyor at several locations along the conveying path of the first conveyor. The fact that the first conveyor describes an arcuate path at least near the junction gives the designer a high degree of freedom in selecting the shape of the first conveyor.

The first conveyor may describe at least a spiral path near the junction, with a central axis of the spiral first conveyor extending at least substantially in vertical direction. These features result in a first conveyor that bridges a difference in height, with the conveyor system being adapted to discharge products at different levels. The advantage of this embodiment is that a compact construction is provided. Moreover, the first conveyor can normally continue its conveying movement whilst discharging a product to the next conveyor. This provides a major advantage in comparison with the use of elevators, for example, as regards the bridging of the difference in height; the fact is that elevators need to be stopped briefly in practice for placing a product on the next conveyor at a different vertical level. It is noted that the bridging of the difference in height by means of a spiral conveyor may take place in upward direction as well as in downward direction.

The conveying direction of the second conveyor near the junction may comprise a radial component relative to a central axis of the spiral first conveyor. The advantage of this embodiment is that on the one hand the transition area of the junction is compact and that on the other hand the moving assembly only need to cover a limited distance for moving the products from the first conveyor to the second conveyor.

In an alternative embodiment, the conveying direction of the second conveyor near the junction may be tangentially oriented relative to a central axis of the spiral first conveyor. The advantage of this is that the direction of movement of products on the first conveyor is only slightly different from that of the second conveyor near the junction. As a result, the products need not be strongly decelerated in their circumferential movement on the first conveyor in order to be moved to the second conveyor.

A practical embodiment may comprise an intermediate form of the aforesaid radial and tangential connection of the second conveyor to the first conveyor.

The first and/or the second conveyor may comprise a number of conveying elements extending substantially parallel to each other.

The parallel conveying elements of the second conveyor have the advantage that they can be configured so that a better connection between the first and the second conveyor can be realised, for example by varying the length of conveying elements of the second conveyor, thus minimising the gap that may be present between the first and the second conveyor. The conveying elements may furthermore be positioned so that they jointly form a second conveying surface such that the two conveying surfaces are more contiguous. This means that, for example in the case of a horizontally oriented conveying direction of the second conveyor, the conveying elements may extend only substantially parallel to each other in top plan view.

The parallel conveying elements of the first conveyor have the advantage that they make it possible to design a first conveyor to have a wide first portion with several parallel conveying elements at the supply end and to move products from one element to the other element at points along the conveying path located a predetermined distance away from said supply end, so that the first conveyor can have a reduced width from a point further downstream of the supply end. The fact is that in practice products will be discharged to the second conveyor, and possibly to several conveyors, so that downstream along the conveying path the conveying capacity of the first conveyor downstream may be smaller.

The moving assembly may be arranged so that the product is moved from the first conveyor to the second conveyor via the junction. It is also conceivable, however, for the product to be lifted over the junction by means of a transfer element, so that the transfer does not take place via said junction.

The moving assembly may comprise a guide for guiding the product present on the first conveyor near the junction to the second conveyor. This is a simple solution for moving the products from the first conveyor to the second conveyor. As a result of the movement of the conveying surface of the first conveyor, the product is automatically guided in the direction of the second conveyor along the guide.

In an embodiment, the guide is movable with respect to the first conveyor. This feature makes it possible to move the guide at a desired moment, in such a manner that from that moment the products will or will not be guided towards the second conveyor.

In an alternative embodiment the guide is a drivable guide. As a result, the products are conveyed to the second conveyor not only by the supporting conveying surface of the first conveyor, but they are also moved in that direction by the actively driven guide. This appears to improve the stability of some products during transport.

The guide may comprise an endless conveyor belt, which can be moved by means of an actuator. The conveyor belt may have an irregularly shaped surface so as to provide an optimised engagement and displacement of products being pushed against the conveyor belt by the first conveyor. Several embodiments of the actuator are possible. Activation of the actuator may for example take place by electric or hydraulic devices.

The junction may be provided with a supporting surface for bridging a gap between the first conveying surface and the second conveying surface. The advantage of this is that small products cannot fall through the gap and that certain products cannot become unstable upon passing the gap, which might lead to the products falling over. The supporting surface may be plate-shaped, but it might also be configured as a roller surface.

The supporting surface can be configured so that the normal of the part of the supporting surface adjacent to the first conveyor has the same orientation as the normal of the part of the first conveying surface adjacent to the supporting surface, and/or that the normal of the part of the supporting surface adjacent to the second conveyor has the same orientation as the normal of the part of the second conveying surface adjacent to the supporting surface. The fact is that a gradual passage from the first conveying surface, via the junction, to the second supporting surface is effected in this way.

The normal of the part of the first conveying surface adjacent to the junction may include an angle with the vertical. This means that the part of the first conveying surface that is located near the junction does not extend in horizontal direction. Such a situation occurs, for example, when a spiral first conveyor is used, whilst a second conveyor is provided along the spiral path of the first conveyor, onto which second conveyor products discharged from the first conveyor land. When the products are discharged in the outward direction of the spiral in such a situation, the products must therefore undergo a movement in vertical direction on the part of the first conveying surface adjacent to the junction in order to be transferred to the second conveyor via said junction, for example. Such a movement may be facilitated by the moving assembly as described in the foregoing, for example.

The first conveyor and the second conveyor can take up a fixed position relative to each other, because it is not necessary to move comparatively heavy conveyors with respect to each other in that case. Less energy is used in this way. In addition, time is gained, because it is not necessary to wait until the first and the second conveyor have been moved together to such an extent that products can be transferred to the second conveyor. It is also possible for the first and the second conveyor to be fixed relative to the environment, of course. This also means that in the situation in which the first and the second conveyor take up a fixed position relative to each other, the junction occupies a fixed position relative to the two conveyors.

The moving assembly, too, may be disposed at a fixed position relative to the first conveyor and/or the second conveyor. This means that the moving assembly is not movable with respect to the first and/or the second conveyor in that case. It is still possible in that case, however, for the moving assembly to be movable by themselves with respect to the first and/or the second conveyor, as for example indicated in the foregoing for a drivable guide. In such an embodiment the guide is moved with respect to the conveyors, to be true, but a reference position of the moving assembly relative to which the guide is moving remains in a fixed position.

An aspect of the invention also relates to a conveyor system for conveying at least one product, comprising a spiral first conveyor having a vertically extending central axis, wherein the first conveyor comprises a number of conveying elements extending substantially parallel to each other, each conveying element comprising at least one supply end for receiving the product and at least one discharge end for discharging the product, whilst the discharge ends of the individual conveying elements are positioned at different vertical levels. In this way products can leave the first conveyor at different levels. The spiral conveyor is a compact solution for bridging a difference in height, whilst the parallel conveying elements, which each describe a spiral path as well, make it possible for products to leave the conveyor at different levels, so that the discharge ends are positioned at different levels. This leads to a system for vertical transport which is more compact than, for example, a system comprising parallel elevators or parallel spiral conveyors each comprising a single conveying element.

The first conveyor may be arranged so that the conveying directions of the individual conveying elements are different from each other at the discharge ends thereof. This embodiment has the advantage that the product can continue on its way in different directions after leaving the first conveyor. In this way a large degree of freedom in the positioning of, for example, subsequent discharge conveyors is created.

A moving assembly may be provided for moving the product from one conveying element to the other conveying element. This makes it possible, for example, to guide products onto a smaller number of conveying elements at the downstream locations because products have already been moved off in an upstream part.

An aspect of the invention is a conveyor system for conveying at least one product, comprising at least one first conveyor, which is adjacent to at least one second conveyor via a junction. The conveying direction of the first conveyor near the junction is different from the conveying direction of the second conveyor near the junction. The first conveyor has a first conveying surface and the second conveyor has a second conveying surface for supporting the product thereon. The orientation of the normal of a part of the first conveying surface adjacent to junction is substantially different from that of the normal of a part of the second conveying surface adjacent to the junction. A moving assembly is configured to move the product from the first conveyor to the second conveyor, or vice versa, wherein the first conveyor describes an arcuate path at least near the junction. The normal of the part of the first conveying surface adjacent to junction has the same orientation as the normal of a part of the second conveying surface adjacent to the junction. In this embodiment the second conveying surface becomes a twisted surface in that it already has substantially the same orientation near the junction as the part of the first conveying surface adjacent to the junction, whilst its orientation further away from the junction is different therefrom. This enables the products to pass the junction in a stable manner, whilst they can undergo a gradual orientation change on the second conveying surface.

The moving assembly may comprise a guide for guiding the product present on the first conveyor near the junction to the second conveyor, which guide can be moved via a translating movement by an actuator, which actuator can be disposed on the side of the second conveyor relative to the first conveyor. The advantage of this is that little space is required at the location of the first conveyor, for example for an actuator for driving the guide. This may be advantageous in particular if the first conveyor is a spiral conveyor.

In an alternative embodiment, the moving assembly may comprise a guide for guiding the product present on the first conveyor near the junction to the second conveyor, which guide can be moved from a non-guiding position to a guiding position via a rotary movement about an axis of rotation, in which guiding position of the axis of rotation is located on a side of the first conveyor that is located opposite the junction. In practice it has become apparent that this manner of positioning enables a rapid movement between the guiding position and the non-guiding position.

An aspect of the invention also relates to a conveyor system for sorting products, comprising at least a first and a second conveying element, which first conveying element and which second conveying element extend at least partially parallel to each other in a spiral path, and a moving assembly for moving at least one product from the first conveying element to the second conveying element, which conveying elements can be driven independently of each other.

BRIEF DESCRIPTION OF THE DRAWINGS

Aspects of the invention will be explained in more detail hereinafter with reference to drawings, which are highly schematic representations of embodiments of the invention.

FIG. 7b is a side elevation along the line VIIb-VIIb in FIG. 7a.

FIG. 11a is a view corresponding to FIG. 10, in which an alternative embodiment of the moving assembly is shown, and FIG. 11b is a sectional view along the line XIb-XIb in FIG. 11a.

FIG. 20 is a perspective view of a part of an embodiment of the conveyor system, in which an example of the first conveyor is shown.

FIG. 21 is a highly schematic side elevation of a part of an embodiment of the conveyor system, in which supply and discharge locations are shown to be present at various positions along the first conveyor.

FIG. 22a is a perspective view of an alternative embodiment of the conveyor system, FIG. 22b is a side elevation thereof, and FIG. 22c is a top plan view thereof.

DETAILED DESCRIPTION OF THE ILLUSTRATIVE EMBODIMENTS

Figure 1:
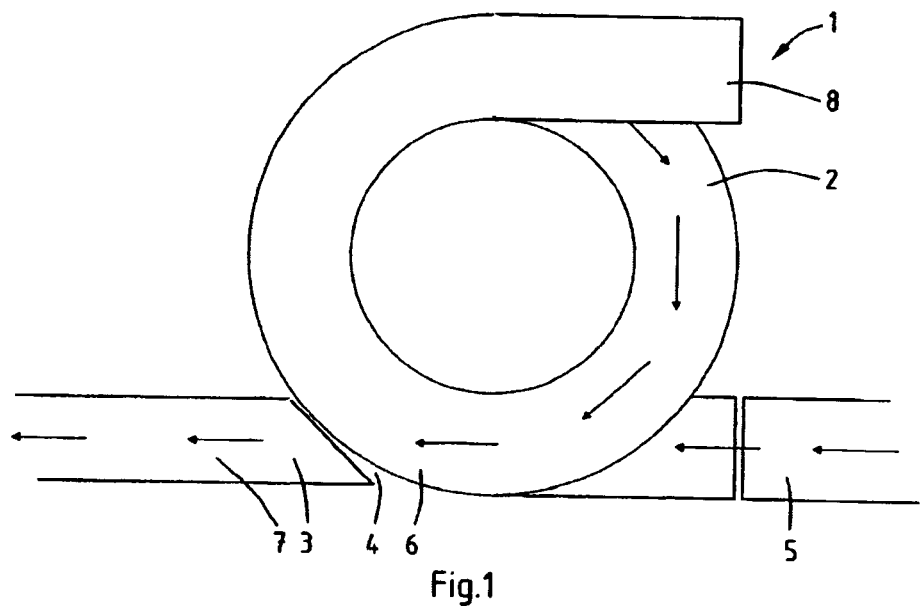
FIG. 1 is a highly schematic top plan view of an embodiment of the conveyor system.

FIG. 1 schematically shows the basic principle of the conveyor system 1 implemented in an embodiment of the invention. The conveyor system 1 comprises a first conveyor 2 and a second conveyor 3. In the illustrated embodiment, the first conveyor 2 partially extends in a spiral path, which is circular in shape when seen from above. The second conveyor 3 extends in the illustrated path. The first and the second conveyor 2, 3 connect to each other via a junction 4. The junction 4 may be located anywhere along one of the windings of the spiral first conveyor 2. The conveying direction of the first conveyor 2 near the junction 4 is different from that of the second conveyor 3 near the junction 4. The conveying direction is indicated by arrows in all the figures. FIG. 1 shows that the first conveyor 2 describes an arcuate path near the junction 4. The figure also shows a supply conveyor 5, which supplies products to the first conveyor 2. In the embodiment that is shown in FIG. 1, the products move in upward direction via the spiral path, but movement in downward direction is also possible, of course, see for example FIG. 21. The supply conveyor 5 is not shown in FIGS. 2-10 for clarity.

The first conveyor 2 has a first conveying surface 6 and the second conveyor 3 has a second conveying surface 7. The conveying surfaces 6, 7 function to support products thereon. The conveying surface 6 of the first conveyor 2 comprises an endless belt made up of slats, which are interconnected, for example by means of a chain. When slats are used, said slats are preferably supported by rollers in their radial direction so as to minimise the amount of friction that occurs in the spiral conveyor. The supporting surface 7 of the second conveyor 3 is for example formed by the upper surface of an endless belt.

In FIG. 1 the second conveyor 3 is the only discharge conveyor between the supply conveyor 5 and an end 8 of the spiral first conveyor 2. It is of course possible to connect several supply and discharge conveyors to the spiral part of the first conveyor 2. This is illustrated in FIG. 21.

The orientation of the normal of the part of the first conveying surface 6 adjacent to the junction 4 is substantially different from that of the normal of the part of the second conveying surface 7 adjacent to the junction 4. As a result, the conveying surfaces 6, 7 on either side of the junction 4 do not connect smoothly, which might lead to instability of the products upon transfer of the products from the first conveyor 2 to the second conveyor 3. In the embodiment shown in FIG. 1, for example, the conveying surface 6 of the first conveyor 2 extends in upward direction at the location of the junction, as seen from the central axis of the spiral first conveyor 2, whilst the conveying surface 7 extends in horizontal direction.

The conveyor system further comprises a moving assembly for changing the direction of movement of products present on the first conveyor 2, so that said products will land on the second conveyor 3. This merits attention in particular when a spiral first conveyor 2 is used, in which case the conveying surface 6 will generally have a relatively high coefficient of friction in order to prevent products from sliding sideways and/or against the conveying direction as a result of the force of gravity. This is in particular the case when the central axis of the spiral is vertical, so that the part of the first conveying surface 6 adjacent to the junction 4 includes an angle with the vertical. The moving assembly will be discussed later on with reference to FIGS. 10-19.

Figure 2:
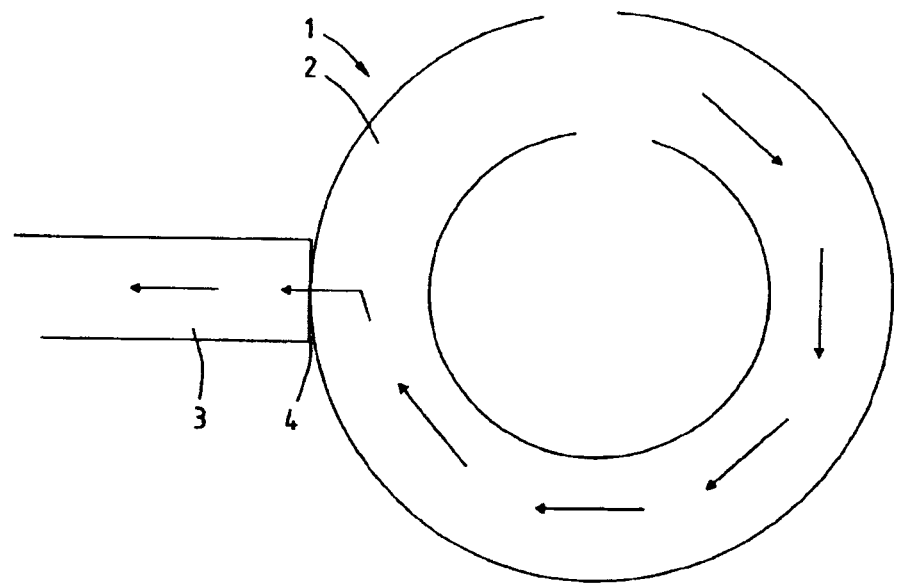
FIGS. 2-6 are views of a part of alternative embodiments of the embodiment of FIG. 1.

FIG. 2 shows an embodiment of the conveyor system 1 in which the conveying direction of the second conveyor 3 near the junction 4 extends radially relative to the central axis of the spiral path of the first conveyor 2. This connection perpendicular to the circumferential direction has the advantage that it leads to a compact junction 4, seen in the circumferential direction of the spiral first conveyor 2. This means, for example, that a transfer element for transferring the products from the first conveyor 2 to the second conveyor 3 only needs to make a small movement. This makes it possible to realise short transfer times. In addition, the products on the first conveyor 2 can be closely spaced in that case, so that it can be decided for each product individually whether or not said product must be transferred from the first conveyor 2 to the second conveyor 3.

Figure 3:
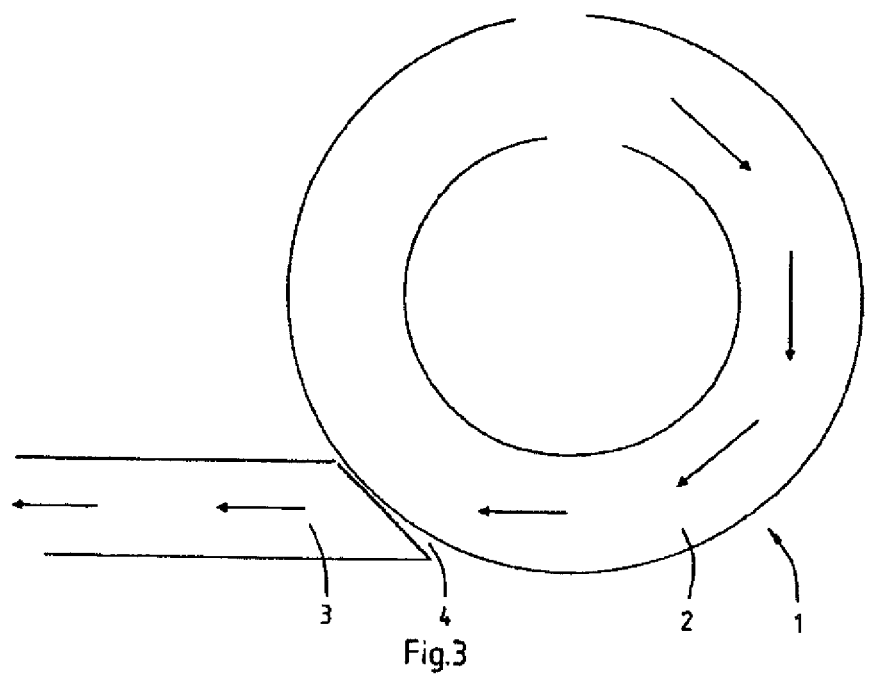

In the embodiment shown in FIG. 3, the conveying direction of the second conveyor 3 near the junction 4 is tangential relative to the central axis of the spiral path of the first conveyor 2. This type of connection has the advantage that the products being transferred from the first conveyor 2 to the second conveyor 3 undergo a small change in direction, as a result of which the transfer can take place quickly and gradually. This embodiment is typically suitable for conveying products which are spaced closely together, because the distance to be covered by a transfer element when sorting out a single product is relatively long, so that it is necessary to maintain a wide spacing between the products. On the other hand it is possible to transfer a series of closely spaced products in one movement. The spacing between the products forming part of the series may be limited in that case, whilst the spacing between two successive series must be somewhat wider.

Figure 4:
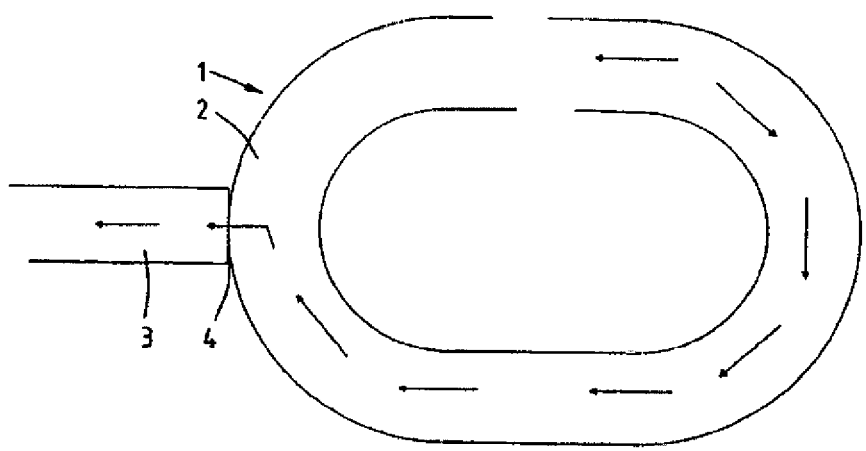

FIG. 4 shows a spiral track, which does not extend around the central axis in a circular path, when seen from above, but rather in an oval path.

Figure 5:
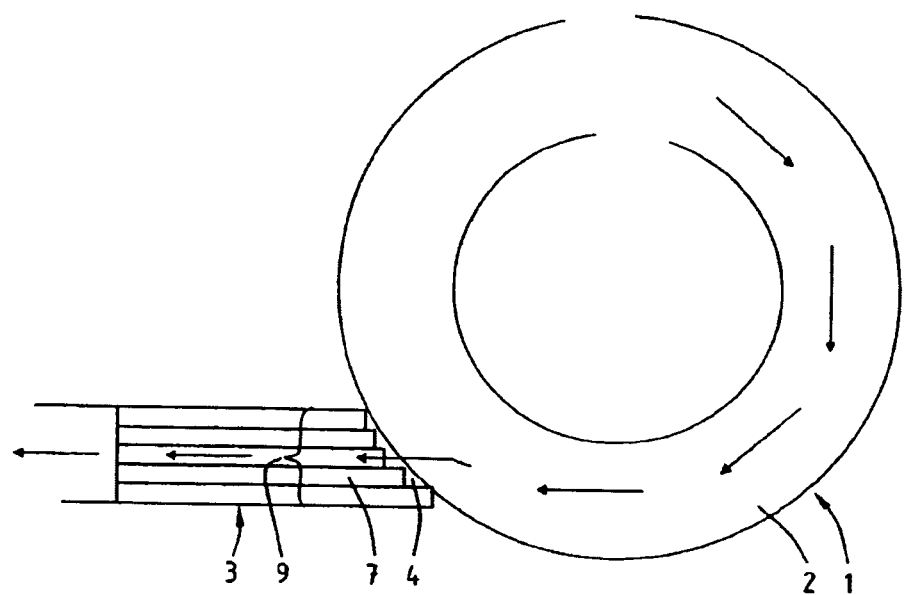

FIG. 5 shows an embodiment in which the second conveyor 3 comprises a number of substantially parallel conveying elements 9. The conveying elements 9 are narrow tracks, which jointly form the second conveying surface 7 on which products are supported. The advantage of using several narrow conveying elements rather than one conveyor track is that variation of the length of the individual conveying elements 9 enables the second conveying surface 7 of the second conveyor 3 to follow the arcuate (seen from above) path without difficulty. In this way the dimension of a gap present between the first conveyor 2 and the second conveyor 3 is kept within bounds. The conveying elements 9 may be endless conveyor belts, for example.

FIG. 5 furthermore shows that the second conveyor 3 extends neither completely radially nor completely tangentially away from the first conveyor 2.

It is also conceivable for the first conveyor 2 to comprise several substantially parallel conveying elements. The advantage of the use of the parallel conveying elements in the first conveyor 2 is that this makes it possible to design the first conveyor 2 with a wide first part comprising several parallel conveying elements at the supply end thereof and to transfer products from one element to another element at a point along the conveying path located some distance away from the supply end, so that the width of the first conveyor 2 could be reduced width from a position further downstream of the supply end. The fact is that in practice products will be discharged to the second conveyor 3, and possibly to several conveyors, so that downstream thereof the capacity of the first conveyor 2 may be smaller. Alternative embodiments of the first conveyor 2 having parallel conveying elements will be discussed later on.

Figure 6:
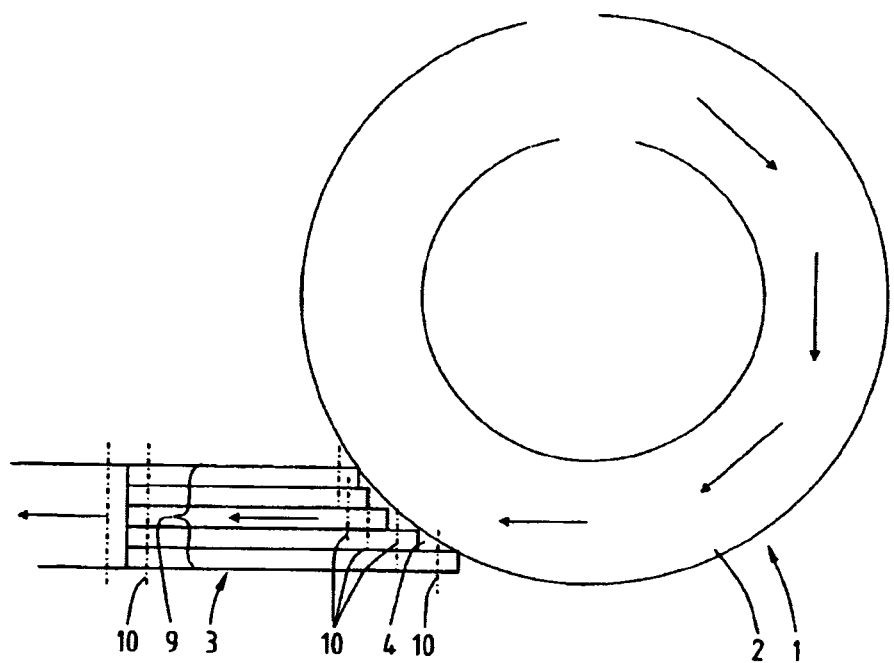

In the embodiment shown in FIG. 6 the parallel conveying elements 9 of the second conveyor 3 are tangentially oriented relative to the spiral first conveyor 2. Said figure also shows axes 10 of reversing rollers of endless conveyor belts 9. The position of the axes 10 indicates that the spacing between the axes 10 of the reversing rollers varies with each conveyor belt 9.

Figure 7A:
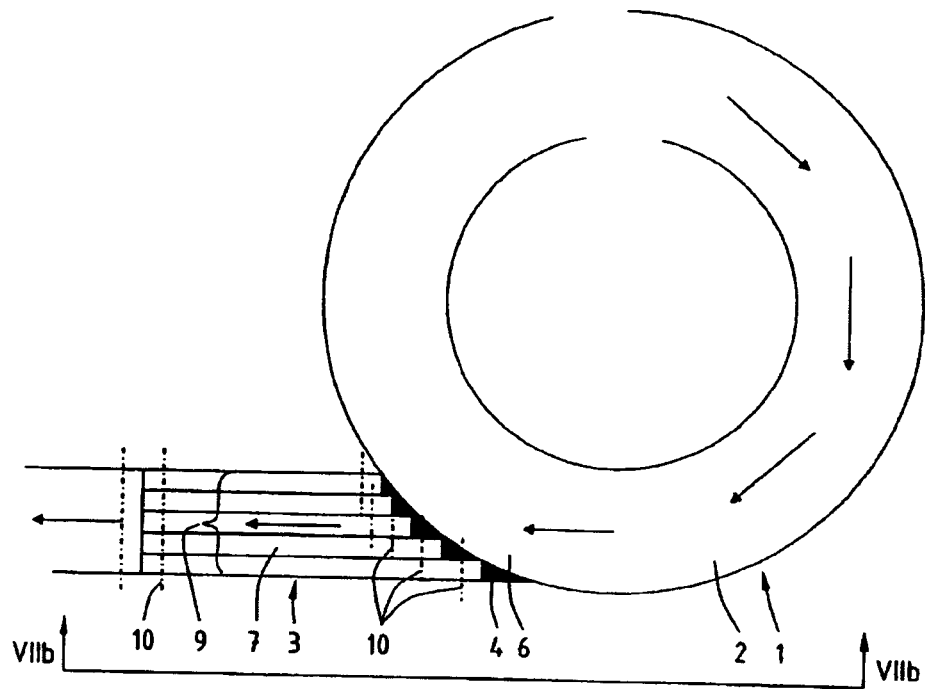
FIG. 7a is a view corresponding to FIGS. 2-6 of an alternative embodiment of the conveyor system.
Figure 7B:
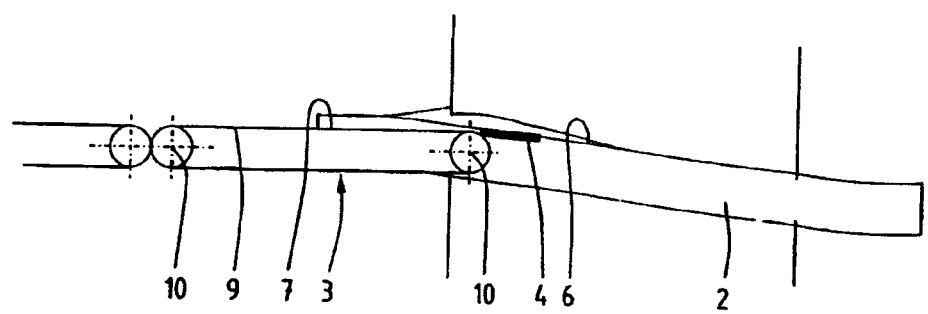

Since the two conveyors 2, 3 are different in shape near the junction 4, the junction 4 between the first conveyor 2 and the second conveyor 3 does not exhibit a uniform width as seen in the circumferential direction of the first conveyor 2 near the junction 4. This might lead to instability of products when said products pass the junction 4. According to one embodiment of the invention, the junction 4 is for that reason provided with a static closure or supporting surface, as illustrated in FIG. 7. This makes it possible to transfer also smaller and/or unstable products from the first conveyor 2 to the second conveyor 3 via the junction 4. The supporting surface may be configured as a plate, but it may also be a roller bed, so that products being conveyed across the junction will experience less resistance.

The junction 4 in the form of a supporting surface may be so configured that the normal of the part of the supporting surface adjacent to the first conveyor 2 has the same orientation as the normal of the part of the first conveying surface 6 adjacent to the supporting surface, and/or that the normal of the part of the supporting surface adjacent to the second conveyor 3 has the same orientation as the normal of the part of the second conveying surface 7 adjacent to the supporting surface. In this way a gradual transition from the first conveyor 2, via the junction 4, to the second conveyor 3 is realised.

Figure 8A:
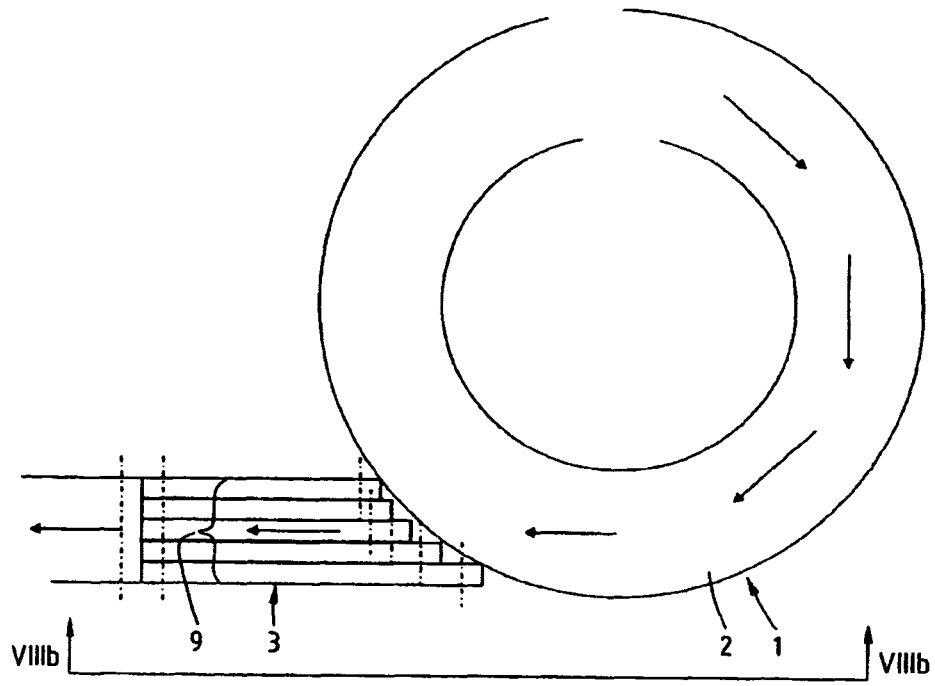
FIGS. 8a and 8b, and 9a and 9b, are views corresponding to FIGS. 7a and 7b of alternative embodiments of the conveyor system.
Figure 8B:
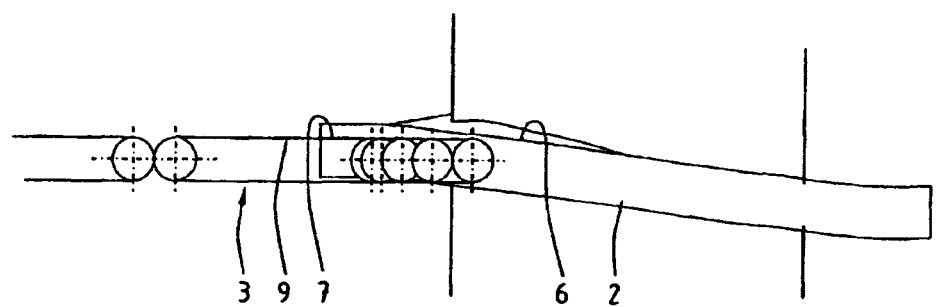
Figure 9A:
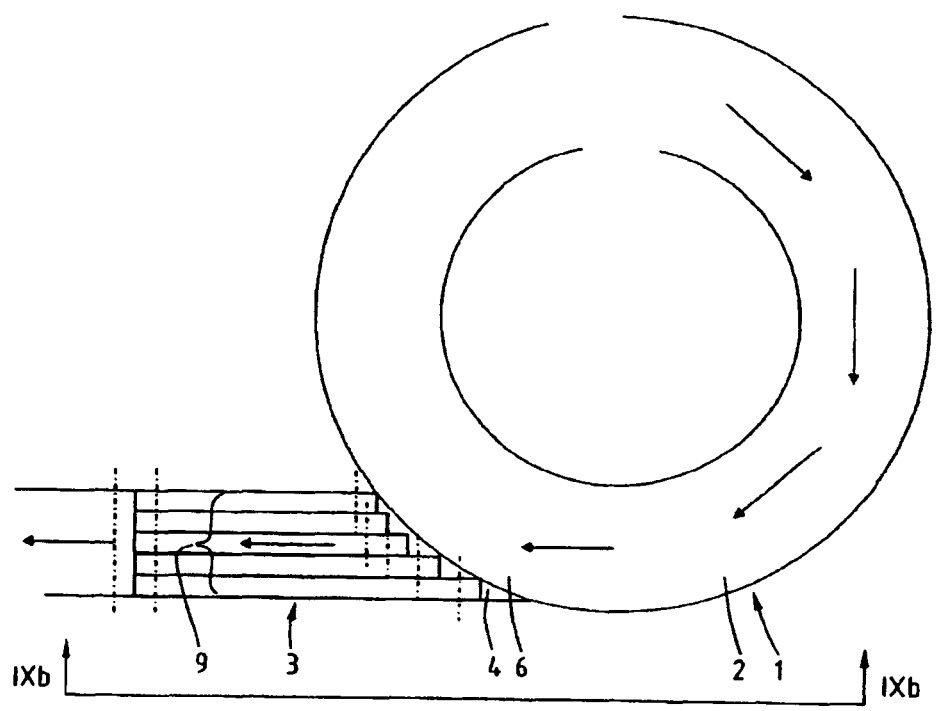
Figure 9B:
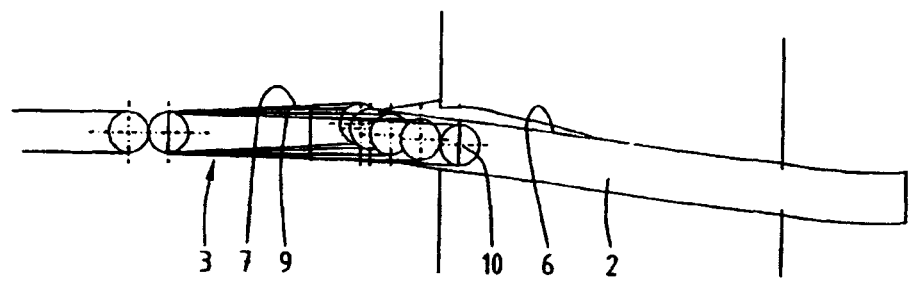

FIG. 8*a* corresponds to FIG. 6, but FIG. 8*b* is a side view of the embodiment of FIGS. 6 and 8*a*, in which the reversing rollers of the individual conveying elements 9 are shown. The orientation of the conveying elements 9 is such that the conveying surface 7 formed by the joint conveying elements 9 extends substantially horizontally. This in contrast to the embodiment shown in FIG. 9. In this figure the narrow conveying elements 9 are oriented in such a manner relative to each other that the second conveying surface 7 is a twisted surface so as to effect a more gradual transition between the first conveying surface 6 and the second conveying surface 7. Seen from above, the conveying elements 9 still extend parallel to each other, but seen from the side they do not. The upper surfaces of the conveying elements 9 thus jointly form the second conveying surface 7. At the location of the junction 4, the first conveying surface 6 and the second conveying surface 7 are at least substantially in line. As shown in FIGS. 9*a* and 9*b*, the reversing rollers are positioned so that they follow the curvature of the arcuate path of the first conveyor 2 at the location of the junction 4. As a result, the dimension of a gap that may be present between the first conveying surface 6 and the second conveying surface 7 at the location of the junction 4 will remain within bounds. In the case of a vertically disposed spiral first conveyor 2, the reversing rollers thus follow both the curvature of the path (seen from above) and the difference in height (seen from the side). The conveying elements 9 may be narrow belts or ropes.

Figure 9C:
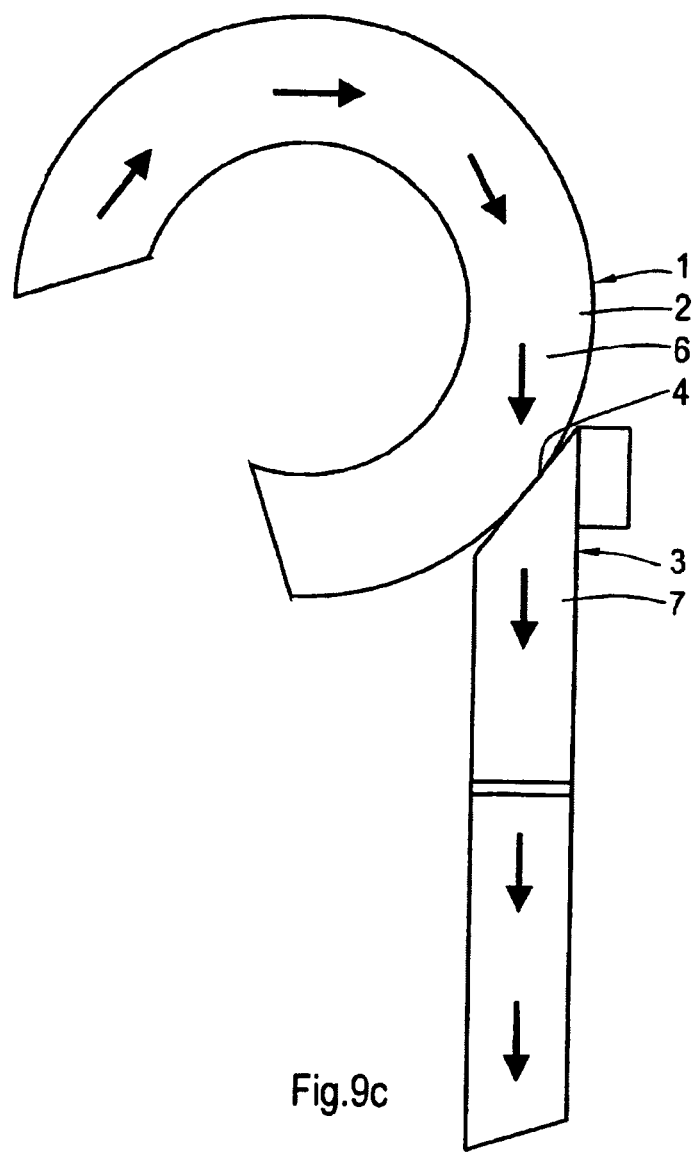
FIG. 9c is a top plan view of another alternative embodiment.

FIG. 9c shows an alternative embodiment, in which the second conveyor 3 comprises an endless belt and a reversing element located near the junction 4. The conveying direction of the belt changes at the location of the reversing element. The reversing element can be a knife edge, a reversing roller having a small diameter, a bar, or the like. The second conveying surface 7 is formed by an upper surface of the conveyor belt. The reversing element is positioned so that at least a portion of a part of the upper surface of the conveyor belt adjacent to the junction 4 is at least substantially in line with the part of the first conveying surface 6 adjacent to the junction 4. If the arcuate path of the first conveyor forms part of a spiral, the two conveying surfaces present on either side of the junction will not be entirely in line in practice if the reversing element is rectilinear in shape.

In the embodiments shown in FIG. 9, the first and the second conveying surface 6, 7 have at least substantially the same normal or on either side of the junction 4, whilst the orientation of the normal of the part of the first conveying surface 6 adjacent to the junction 4 is different from that of the normal of a part of the second conveying surface 7 that is spaced from the junction 4 by some distance. This means that the conveying surface 7 is a twisted surface.

To move the products from the first conveyor 2 to the second conveyor 3, the conveyor system 1 is provided with a moving assembly, which moves the products via the junction 4. FIGS. 10-20 show various embodiments of the conveyor system 1, in which the moving assembly are configured as a guide 11, which guides the product present on the first conveyor 2 near the junction 4 to the second conveyor 3.

Figure 10:
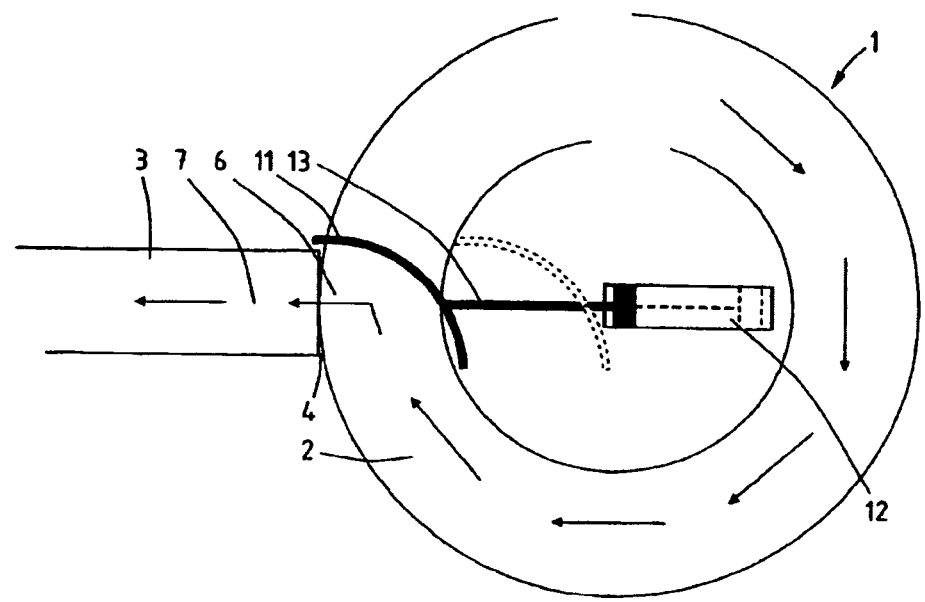
FIG. 10 is a view corresponding to FIG. 2, in which an embodiment of the moving assembly is shown.

FIG. 10 shows a guide 11 of simple design formed of an arcuate element. It is conceivable, however, for the guide 11 to be a flat plate. The guide 11 is movable with respect to the first conveyor 2. In FIG. 10 the movement of the guide 11 is activated by a movable rod 13, which can telescope from a cylinder 12 in this case. The movement of the guide 11 can be effected in many ways, however, for example by means of compressed air, by means of a vacuum, electrically, magnetically, etc. The embodiment shown in this figure is typically suitable for use with small and light products, which can readily slide across the conveying surface 6 of the first conveyor 2 without falling over easily. The push-out guide 11 can make a stroke for each product that passes. This is typically suitable for use with relatively light-weight products, in connection with the perpendicular path of movement the products need to follow from the first conveyor 2 to the second conveyor 3.

For products that can slide less easily, the moving assembly may be configured as double moving assembly, as shown in FIG. 11. The embodiment shown therein comprises a kind of flap belt 14, but many other embodiments are conceivable as well. In this case the products are moved from the first conveyor 2 onto the second conveyor 3 by means of the flap belt 14 that circulates above the first conveyor 2.

Figure 12A:
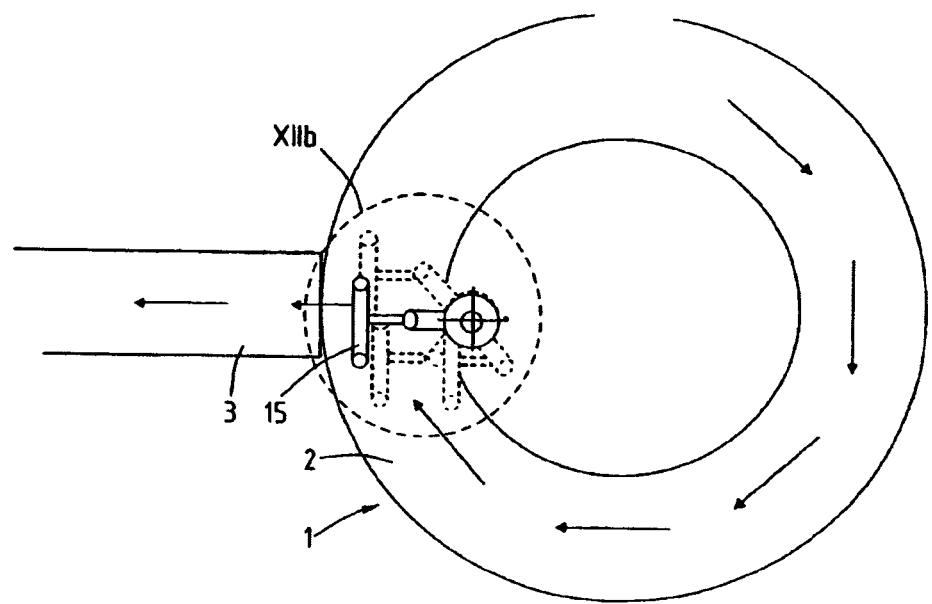
FIG. 12a is a view corresponding to FIG. 10, in which an alternative embodiment of the moving assembly is shown.
Figure 12B:
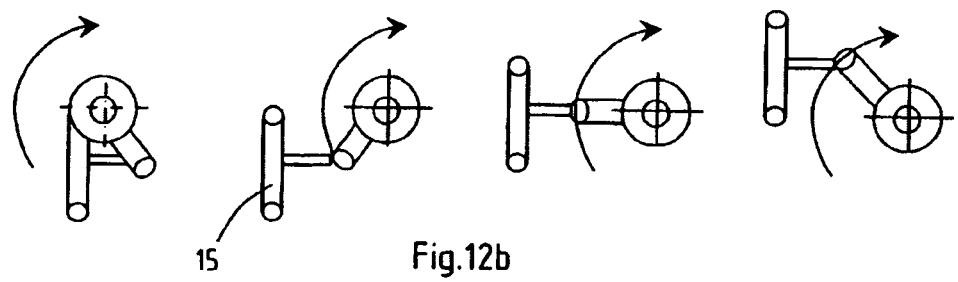
FIG. 12b is a detail view of the area IIb in FIG. 12a, in which various positions of the moving assembly are shown.

In the embodiment shown in FIG. 12, the moving assembly is configured as a pusher element 15, which can be driven via a kind of crank-connecting rod mechanism. The pusher element 15 makes a movement in the direction of the conveying direction of the second conveyor 3 and also moves in tangential direction relative to the central axis of the spiral first conveyor 2. The products present on the first conveyor 2 are thus gradually pushed in the direction of the second conveyor 3. In this way a stable manner of movement is realised.

Figure 13:
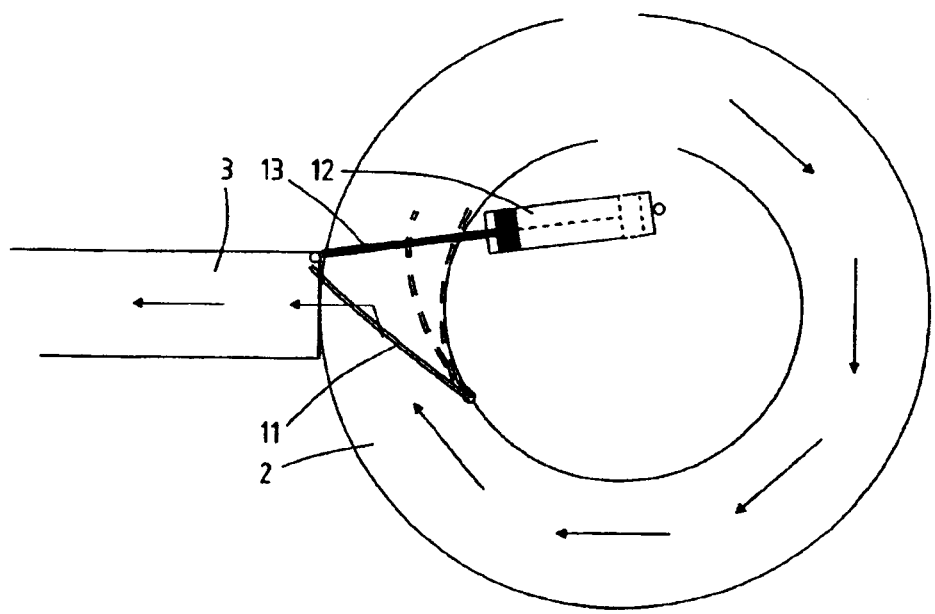
FIGS. 13-19 are views corresponding to FIG. 10, which show alternative embodiments of the moving assembly with various configurations of the junction between the first and the second conveyor.

The advantage of the moving assembly of the embodiments shown in FIGS. 12 and 13 is that they do not make a return stroke. This makes it possible for the products to be conveyed at a comparatively high velocity by the conveyor system 1.

FIG. 13 shows an embodiment in which, similarly to FIG. 10, the guide 11 can be moved in the outward direction of the spiral conveyor 2 by a cylinder 12 via a rod 13. The guide 11 comprises a flexible plate, along which the product present on the first conveyor 2 can be guided. The guide 11 can be moved to the outer side of the first conveyor 2, for example at the moment when a product being supplied arrives at the pivot point of the guide 11. In this way the product can be gently brought into contact with the guide 11 and be smoothly deflected in the direction of the second conveyor 3. An arriving prod-product will thus not bump against the guide 11. This makes it possible to realise high transport velocities of the first conveyor 2. In the embodiment shown in FIG. 13, the guide 11 may also be formed by a drivable endless conveyor belt similar to that illustrated in FIG. 14. In this way it is possible to realise an even smoother transfer of the products from the first conveyor 2 to the second conveyor 3.

Figure 14:
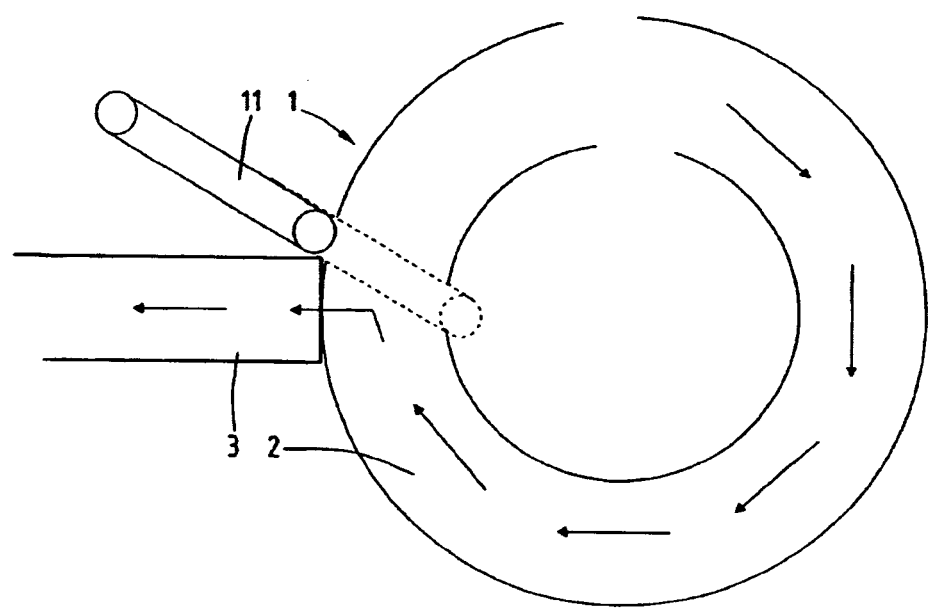

The guide 11 shown in the embodiment of FIG. 14 is linearly movable in the inward direction of the spiral first conveyor 2. The guide 11 comprises a driven endless conveyor belt, whose reversing rollers rotate about vertical axes. The vertical axes take up a fixed position relative to each other. When the guide 11 is moved as a whole in the inward direction of the first conveyor 2, as indicated in dashed lines in FIG. 14, the products are pushed against the guide 11 by the first conveyor 2 and pulled along in the conveying direction of the second conveyor 3 by the conveyor belt of the guide 11, which moves in the direction of the second conveyor 3. With some types of products, the conveyor belt need not be driven for transferring the products. Think of light-weight, stable products generally exhibiting good shape stability, such as boxes and crates, in this connection.

Figure 15:
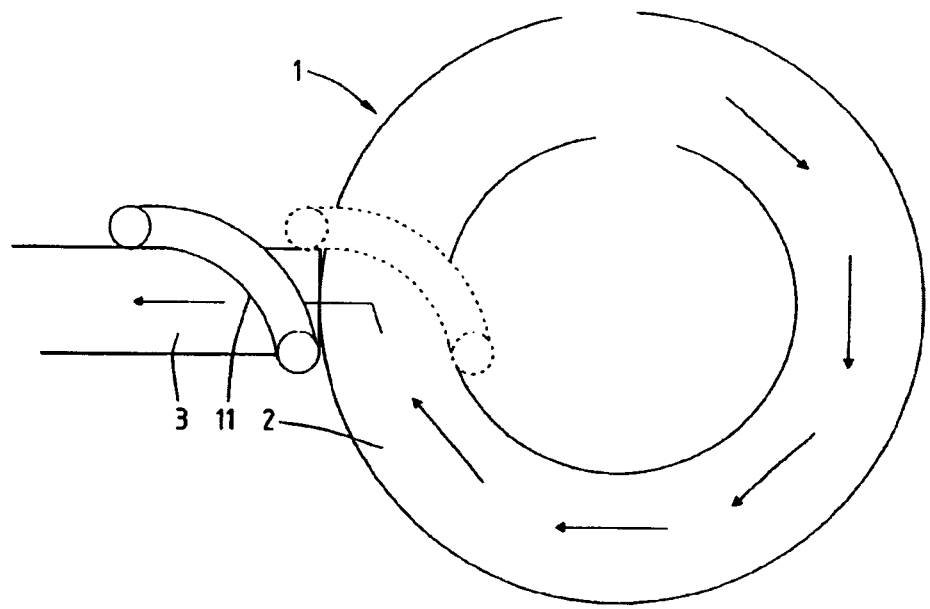

FIG. 15 shows an embodiment in which the guide 11 is arcuate in shape. This guide 11, too, might comprise a driven endless conveyor belt.

If the guide 11 shown in FIGS. 14 and 15 comprises a drivable endless conveyor belt, which conveyor belt is a vertically oriented, it can be preferable if the conveyor belt is wide. In this way a high wall of the guide 11 is created, so that the products are intercepted in a stable manner.

Figure 16:
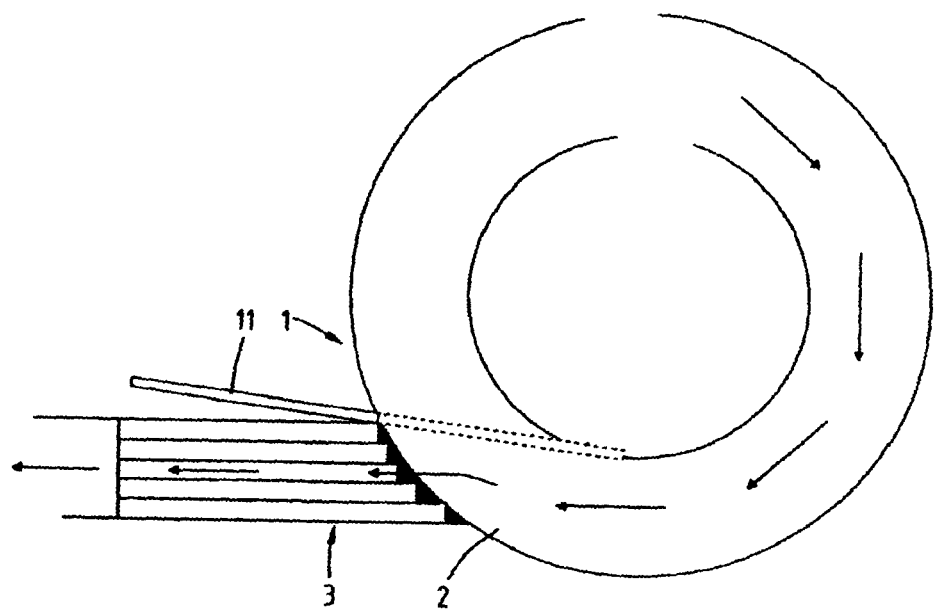
Figure 17:
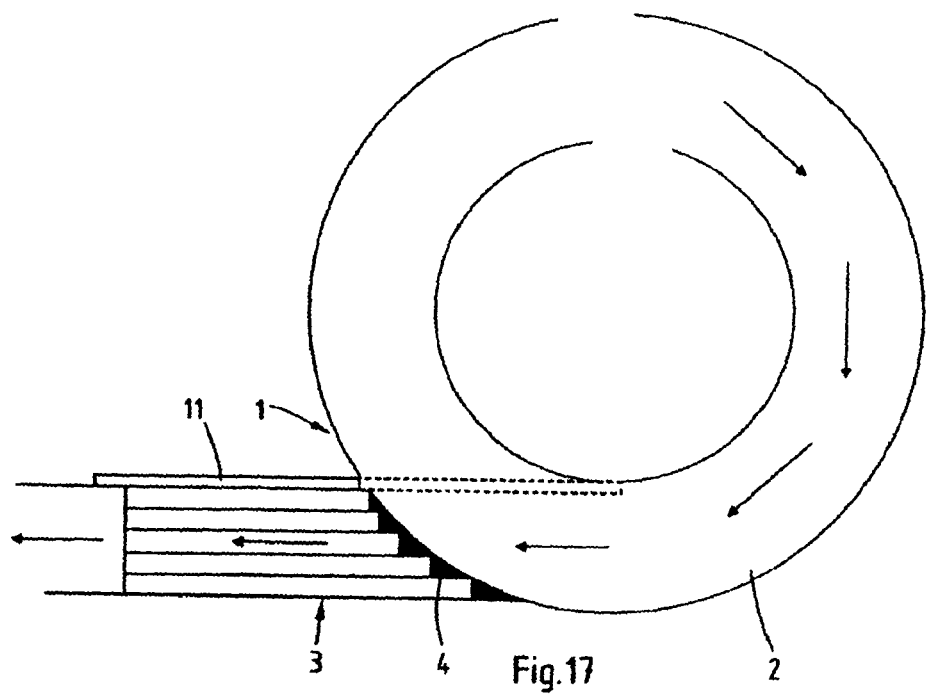

FIGS. 16 and 17 show embodiments in which the guides 11 comprise elements that telescope in and out. In the case of FIG. 16, the second conveyor 3 extends almost tangentially relative to the first conveyor, whilst in the case of FIG. 17 the second conveyor 3 extends fully tangentially from the first conveyor 2. As a result of the (nearly) tangential deflection of the products, the energy with which the products impact with the guide 11 is comparatively small in these embodiments.

Figure 18:
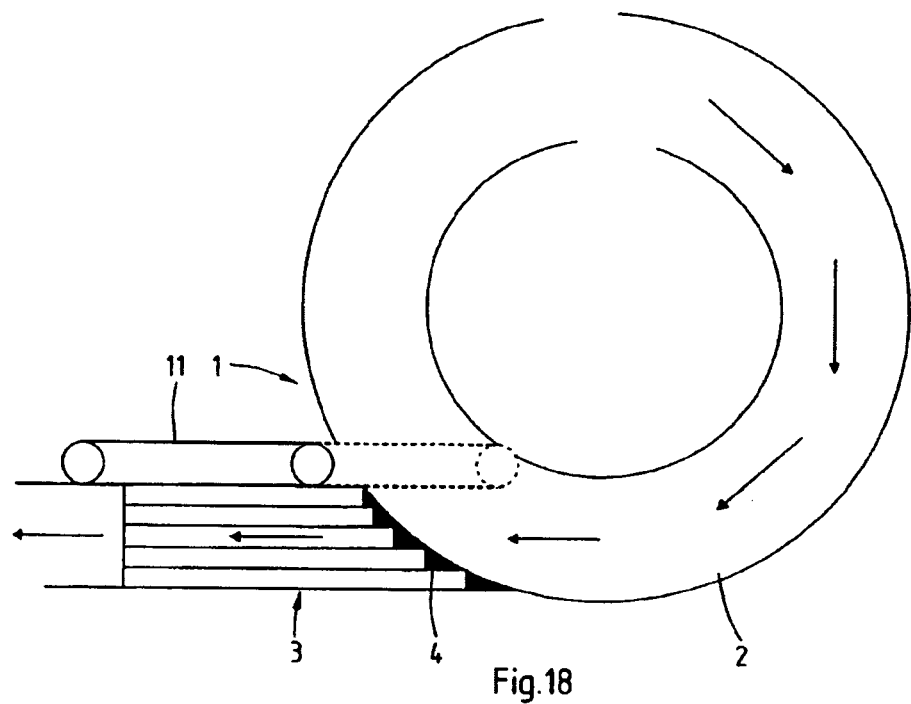

The embodiment shown in FIG. 18 strongly resembles the embodiment shown in FIG. 14, but in this embodiment the guide 11 extends tangentially relative to the first conveyor 2. In the situation in which the guide 11 comprises a driven endless conveyor belt, the reversing rollers take up a fixed position relative to each other in this embodiment and the conveyor belt telescopes out as an entire unit in the inward direction of the spiral first conveyor 2.

Figure 19:
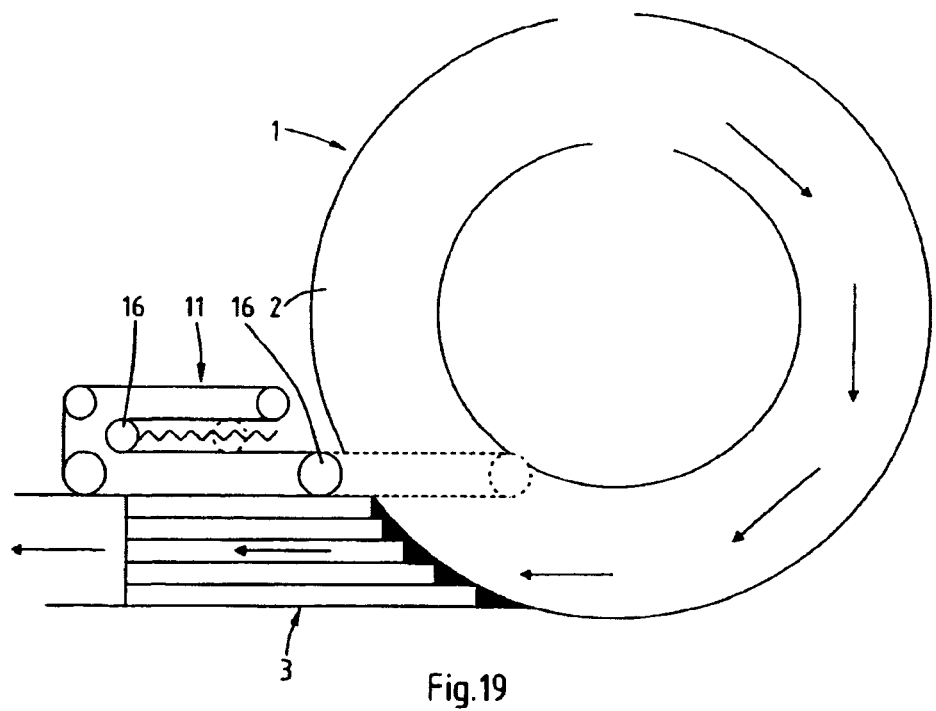

In the embodiment shown in FIG. 19, the guide 11 is formed by an extensible endless conveyor belt. In this case the belt is moved by movable reversing rollers 16. Said reversing rollers may be moved out by an actuator, for example via a telescoping mechanism. The reversing roller located closest to the first conveyor 2 can be moved in transverse direction over a conveyor track of the first conveyor 2. The advantage of this mechanism is that its moving mass is not very large. In addition, a product will not be pushed over easily during the retracting movement of the guide from said product, since the belt can continue to run while being retracted.

FIGS. 14-19 show that the guide 11 can translate from a non-guiding position to a guiding position, which movement from the non-guiding position to the guiding position takes place from the second conveyor 3 to the first conveyor 2, or, in other words, in the direction of the inner side of the spiral. The advantage of this movement is that space is saved at the inner side of the spiral and that an actuator can be accessed from outside more easily, for example for maintenance. The actuator is located on the side of the second conveyor 3 relative to the first conveyor 2, so that space is saved at the location of the first conveyor 2. The use of such a guide is not limited to the use thereof with a first conveyor and a second conveyor whose conveying surfaces located on two different sides of the junction have differently oriented normals. It is also possible to use the guide at the junction between two random conveyors not having the same conveying direction at the location of the junction. The conveying surfaces may lie in one plane on either side of the junction, for example.

FIG. 20 shows an embodiment of the first conveyor 2 in a static arrangement. This means that the first conveyor takes up a fixed position relative to its surroundings, in this case the ground. The return track of the spiral first conveyor 2 (in this case the downwardly moving track) follows a different path than the part of the track on which products are conveyed (the spiral part).

All the embodiments of the conveyor system 1 shown and described herein may take up a fixed position relative to the surroundings. In that case the first conveyor 2, the second conveyor 3 and the supply conveyor 5 may be fixed in position relative to each other. The advantage of this is that the comparatively heavy conveyors 2, 3 need not be moved for being placed in the desired position relative to each other. The moving assembly may be fixed to the surroundings or to one or more of the conveyors 2, 3, so that also the moving assembly take up a fixed position relative to the first and/or the second conveyor 2, 3. This, too, has the advantage that the extent of movement of heavy parts is minimised.

FIG. 21 shows the first conveyor 2 with several supply and discharge conveyors 3, 5 disposed at random positions along the spiral path of the first conveyor 2. In the illustrated embodiment, said supply and discharge conveyors 3, 5 connect to the first conveyor 2 at fixed vertical levels. This also means that the moving assembly may indeed take up a fixed position relative to the conveyors, in which case the moving assembly may comprise guides 11 that are movable with respect to the conveyors, as described in the foregoing. Said levels might be varied by making the supply and discharge conveyors 3, 5 adjustable for height.

FIG. 22 shows an alternative embodiment of the conveyor system 1 for vertical transport of products. In this embodiment the first conveyor 2 describes a spiral path about a vertically extending central axis. The first conveyor 2 comprises two conveying elements 17a and 17b extending parallel to each other. The conveying element 17b forms the inner spiral path and the conveying elements 17a forms the outer spiral path. The two conveying elements 17a, 17b each comprise their own endless belt made up of slats which are interconnected via a chain, for example. FIGS. 22a and 22b show that the two conveying elements each have their own upward return path as well.

Each conveying element 17a, 17b has at least one supply end for receiving the product. In the embodiment shown in FIG. 22, the supply end is located at the top of the spiral first conveyor 2. In the case of a conveyor that conveys in upward direction, the supply end will generally be located at the bottom of the conveyor. The conveying elements 17a, 17b also comprise a discharge end 18a, 18b, respectively, for discharging products. In FIG. 22 the individual conveying elements 17a and 17b of the first conveyor 2 convey in the same direction at the location of the discharge ends 18a and 18b, but they are positioned at different vertical levels.

Figure 23:
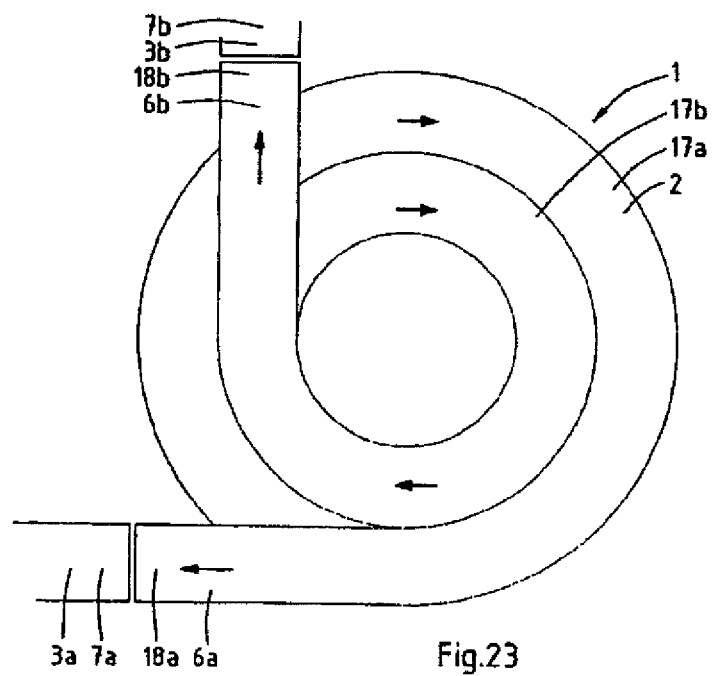
FIG. 23 is a view corresponding to FIG. 22c of an alternative embodiment thereof.

FIG. 23 shows an embodiment comparable to the embodiment of FIG. 22 in top plan view, but in this case the conveyor 2 conveys products in upward direction. The inner conveying element 17b continues further in upward direction than the outer conveying element 17a. As a result, the discharge end 18b is positioned at a higher level than the discharge end 18a, so that products present on the conveying element 17b are moved to a higher level that products present on the conveying element 17a. FIG. 23 also shows parts of two subsequent conveyors 3a and 3b. In this embodiment a product-supporting conveying surface 6a, 6b of the first conveyor 2 may lie in substantially the same plane as a conveying surface 7a, 7b of the subsequent conveyors 3a, 3b, because in this embodiment the subsequent conveyors join the conveying element 17 end-to-end.

Figure 24:
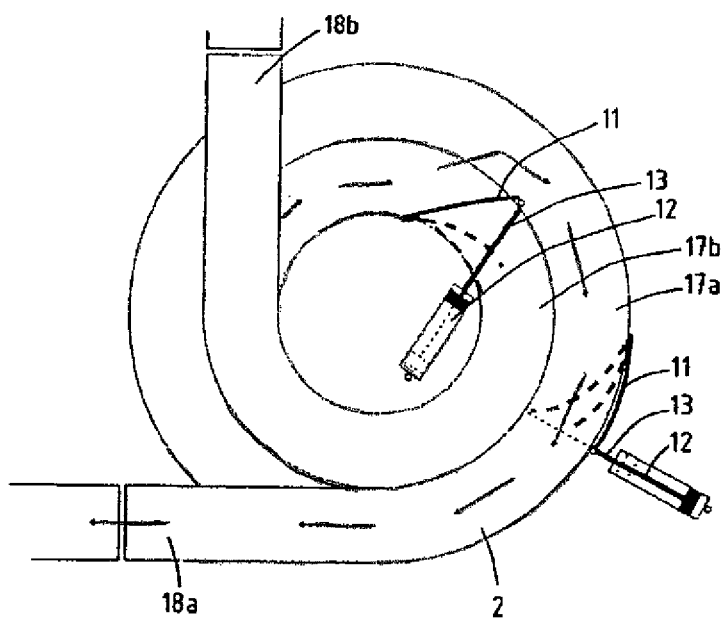
FIGS. 24 and 25 are views corresponding to FIG. 23, which show moving assembly in various positions thereof.

FIG. 24 shows an embodiment in which moving assembly is provided for moving the product from one conveying element 17b to the other conveying element 17a, and vice versa. All kinds of embodiments for realising this transfer are conceivable. The embodiment shown in this figure has the same characteristics as the embodiment shown in FIG. 13 and described with reference thereto. FIG. 24 shows the situation in which the guides 11 guide products from the conveying element 17b to the conveying element 17a, whilst in FIG. 25 the products are guided from the conveying element 17a to the conveying element 17b. FIG. 26 shows that the products pre-selected before being placed on the conveying elements 17a-17b. Once a product has landed on one of the conveying elements 17, it will remain present thereon until it reaches the discharge end 18 associated therewith.

Figure 25:
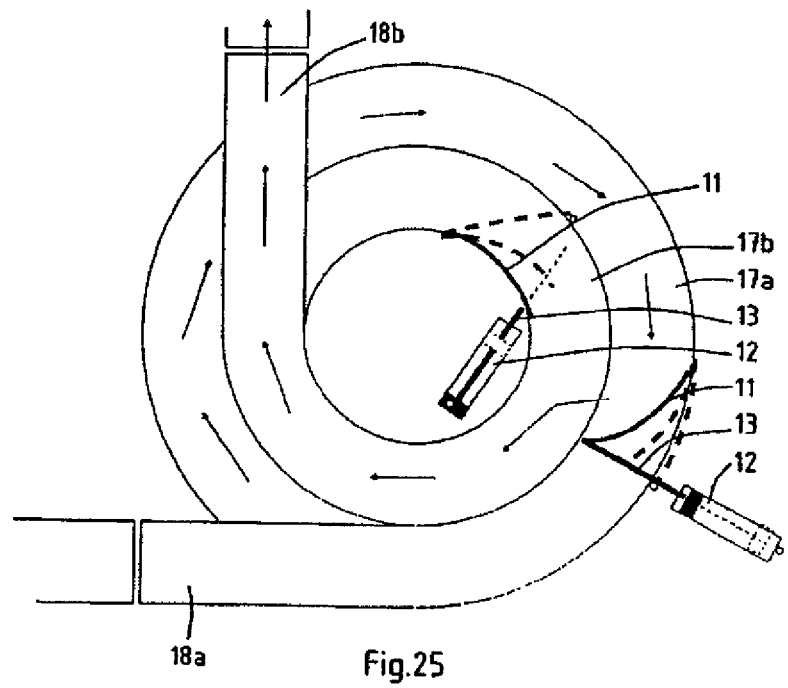
Figure 26:
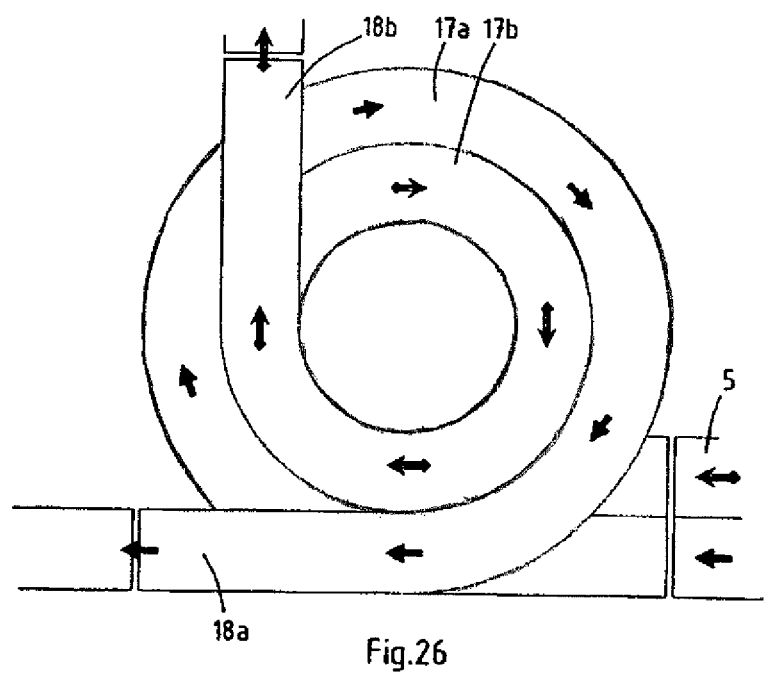
FIG. 26 is a view corresponding to FIG. 23, in which the transportation of preselected products is illustrated.

The guides 11 shown in FIGS. 24 and 25 may be guides that operate very quickly and are capable of moving one product from a series of products, for example, from one conveying element to the other conveying elements. In this way a product flow can be sorted. This means that the order of products at a starting point of the conveyor may be different from said order at an end point of said conveyor. This solution is not limited to an embodiment as shown in FIGS. 24 and 25, but it may also be used with other conveyors comprising at least two parallel conveyor belts moving in the same direction.

Figure 27:
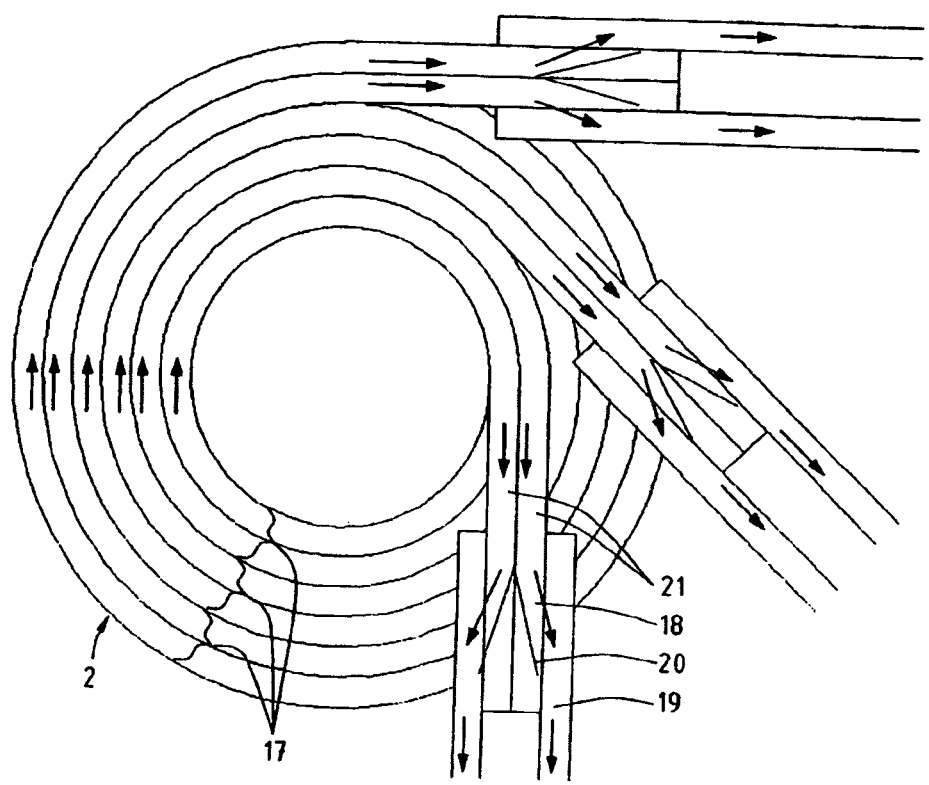
FIG. 27 is a view corresponding to FIG. 23 of an alternative embodiment thereof.

In each of the FIGS. 22-26 the first conveyor 2 is shown to comprise two parallel spiral conveying elements 17a-17b, but it stands to reason that said number or conveying elements may be larger. In FIG. 27, for example, an embodiment is shown in which the spiral first conveyor 2 comprises three conveying elements 17. Each of the conveying elements 17 is divid-divided into a number of parallel sub-conveying elements 21, which extend parallel to each other between the supply end and the discharge end 18 of the corresponding conveying element 17. This means that the conveying elements 17 leave the first conveyor 2 in pairs. In this embodiment, the products are furthermore transferred to parallel belts 19 at the discharge ends 18 of the conveying elements 17, which parallel belts 19 extend on either side of the sub-conveying elements 21. This is effected by means of deflectors 20, for example. This manner of transferring products from a discharge end 18 to parallel belts 19 is usual when light and unstable products are to be conveyed.

Figure 28:
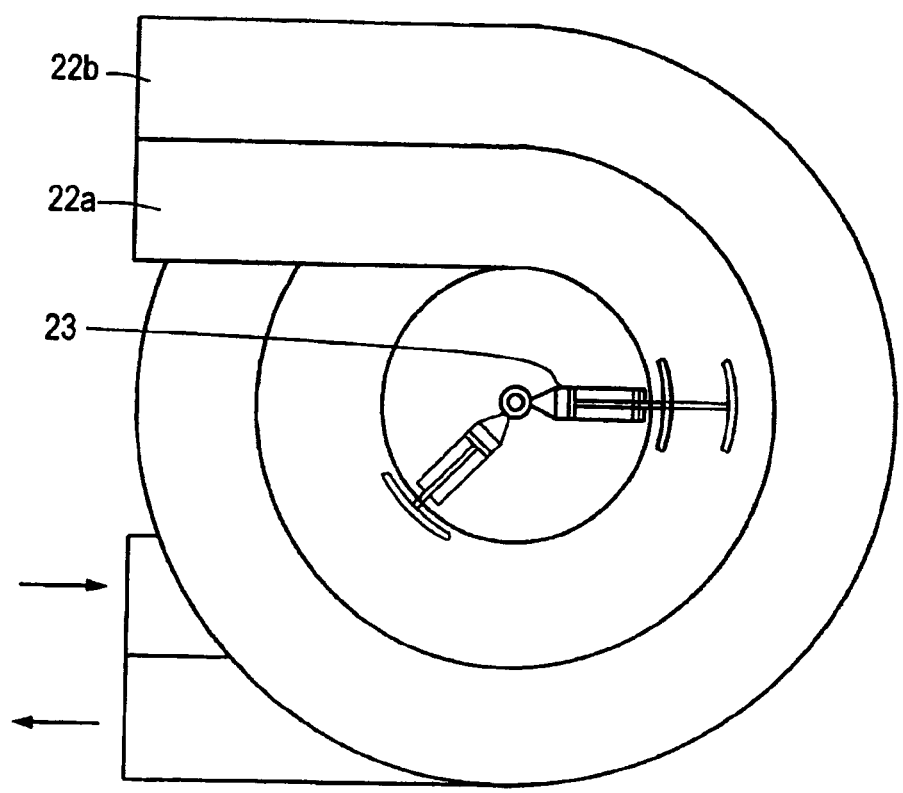
FIG. 28 is a top plan view of a conveyor system arranged as a sorting device.

FIG. 28 shows an alternative conveyor system in which a spiral conveyor comprising at least one in conveyor belt 22a as a first conveying element and an outer conveyor belt 22b as a second conveying element is provided with at least one transfer element 23 forming the moving assembly. The conveyor belt 22a and 22b extend parallel to each other, their conveying directions being opposed to each other in this case, but they may also have the same conveying direction. Products present on the inner conveyor belt 22a can be placed on the outer conveyor belt 22b, and possibly vice versa, by means of the transfer element 13. The embodiment shown in FIG. 28 can be used for sorting products. The products enter the spiral conveyor in a specific order via the inner belt 22a and can subsequently be placed on the outer belt by the transfer element 23. During said transfer, the order of the transferred products on the outer conveyor belt 22 can be changed in comparison with that of the products on the inner conveyor belt 22a by changing the position of the inner conveyor belt 22a relative to that of the outer conveyor belt 22b while individual products are being transferred. During said transfer, the inner conveyor belt 22a and the outer conveyor belt 22b may be stationary relative to each other, but they may also continue to run. The conveyor belts 22a and 22b can be driven independently of each other.

In practice it is advantageous to move the products from the inner conveyor belt 22a to the outer conveyor belt 22b when a spiral conveyor is used, because the available space increases towards the outer side of the spiral. In this way the transfer may take place with less precision and the products may be spaced closely together on the inner conveyor belt 22a. Furthermore, the use of a spiral conveyor in the present conveyor system has the advantage that the transfer element 23 only needs to make relatively small movements to reach the products to be transferred. The transfer element 23 may for example rotate about a fixed axis in the centre of the spiral and translate in vertical direction in the case of a vertically disposed spiral conveyor. In the case of a rectilinear, parallel conveyor belts, for example, the transfer element will have to cover larger distances. In the illustrated example the transfer element 23 may make a helical movement, and the transfer element may comprise a simple pusher mechanism for moving the products from one conveyor belt to the other. It is also conceivable that the position of the transfer element 23 relative to the conveyor belts 22a and 22b is different from that shown in FIG. 28, the transfer element may for example be positioned between the inner and the outer conveyor belts 22a, 22b and move along therewith. In addition to that, more than one transfer element may be provided. Embodiments in which the above features are combined are also possible, of course.

The movement in opposite directions of the inner conveyor belt 22a to the outer conveyor belt 22b furthermore has the advantage that the products approach one another more rapidly, so that they can be transferred more rapidly, thus accelerating the entire process.

It will be apparent from the foregoing that in the conveyor system the products can be moved from the first conveyor 2 to the second conveyor 3 by the moving assembly in spite of the different conveying directions of the first conveyor 2 and the second conveyor 3 and in spite of the different orientations of the conveying surfaces 6 and 7, respectively, thereof.

The invention is not limited to the embodiments shown in the figures, which can be varied in several ways within the scope of the invention. It is for example possible for the moving assembly to move the products from the first conveyor to the second conveyor without the products coming into contact with the junction, for example by lifting the products over the junction and placing them on the second conveyor. Furthermore it is conceivable to use an embodiment wherein the first conveyor comprises a non-spiral, upwardly transporting conveying element, in which case the conveyor will be an upwardly sloping conveyor belt, for example, having discharge locations at various vertical levels, whilst a moving assembly is provided for discharging products to a second or several conveyors at said levels. Furthermore it is conceivable to use embodiments in which the various features of the above-described embodiments are combined.

What is claimed is:

1. A conveyor system for conveying at least one product, comprising a spiral first conveyor having a vertically extending central axis, wherein the first conveyor comprises a number of conveying elements extending substantially parallel to each other, each conveying element comprising at least one supply end for receiving the product and at least one discharge end for discharging the product, and wherein the discharge ends of the individual conveying elements are positioned at different vertical levels, and wherein the conveying elements are driven independently from each other.

2. The conveyor system according to claim 1, wherein the first conveyor is configured so that the conveying directions of at least two of the individual conveying elements are different from each other at the discharge ends thereof.

3. The conveyor system according to claim 1, wherein the first conveyor is configured to convey products in upward or downward direction.

4. The conveyor system according to claim 1, and further comprising a moving assembly configured to move the product from one conveying element to the other conveying element.

5. The conveyor system acccording to claim 1 wherein the conveying elements have the same conveying direction.

6. The conveyor system according to claim 1, wherein at least one of the conveying elements is divided into a number of parallel sub-conveying elements, which extend parallel to each other between the supply end and the discharge end of the corresponding conveying element.

7. The conveyor system according to claim 6, and further comprising parallel conveying belts extending on either side of the sub-conveying elements at the discharge ends, and deflectors configured to transfer products from the sub-conveying elements to the parallel belts.

8. The conveyor system according to claim 1, wherein the conveying elements have conveying directions in the same or in opposite directions.

9. The conveyor system according to claim 1, wherein the parallel conveying elements are adjacent to each other.

10. A conveyor system for sorting products, comprising at least a first conveying element and a second conveying element, which first conveying element and which second conveying element extend at least partially parallel to each other in a spiral path, and a moving assembly configured to move the product from one conveying element to the other conveying element, and wherein the conveying elements are driven independently of each other.

11. The conveyor system according to claim 10, wherein the first conveying element and the second conveying element are so configured that a transfer between the first conveying element and the second conveying element occurs at least substantially without encountering obstacles.

12. The conveyor system according to claim 10, wherein the moving assembly is configured to move one product from a series of products.

13. The conveyor system according to claim 10, wherein operating the moving assembly comprises rotating the moving assembly about and translating the moving assembly along a fixed axis in the center of the spiral.

14. A conveyor system for sorting products, comprising at least a first conveying element and a second conveying element, which first conveying element and which second conveying element extend at least partially parallel to each other in a spiral path, and a moving assembly configured to move the product from one conveying element to the other conveying element, and wherein the first and the second conveying element convey in opposite directions.

15. A conveyor system for sorting products, comprising at least a first conveying element and a second conveying element, which first conveying element and which second conveying element extend at least partially parallel to each other in a spiral path, and a moving assembly configured to move the product from one conveying element to the other conveying element, and wherein the moving assembly is rotatable about and translatable along a fixed axis in the center of the spiral.

16. A conveyor system for conveying at least one product, comprising a spiral first conveyor having a vertically extending central axis, wherein the first conveyor comprises a number of conveying elements extending substantially parallel to each other, each conveying element comprising at least one supply end for receiving the product and at least one discharge end for discharging the product, and wherein the discharge ends of the individual conveying elements are positioned at different vertical levels, wherein at least one of the conveying elements is divided into a number of parallel sub-conveying elements, which extend parallel to each other between the supply end and the discharge end of the corresponding conveying element; and further comprising parallel conveying belts extending on either side of the sub-conveying elements at the discharge ends, and deflectors configured to transfer products from the sub-conveying elements to the parallel belts.

* * * * *